US012394377B2

(12) United States Patent
Zhang

(10) Patent No.: US 12,394,377 B2
(45) Date of Patent: Aug. 19, 2025

(54) DISPLAY PANEL WITH IMPROVING FLICKERING PROBLEM IN LOW FREQUENCY MODE, AND DISPLAY DEVICE

(71) Applicants: Wuhan Tianma Micro-Electronics Co., Ltd., Wuhan (CN); Wuhan Tianma Micro-Electronics Co., Ltd. Shanghai Branch, Shanghai (CN)

(72) Inventor: Di Zhang, Wuhan (CN)

(73) Assignees: Wuhan Tianma Micro-Electronics Co., Ltd., Wuhan (CN); Wuhan Tianma MicroElectronics Co., Ltd. Shanghai Branch., Shanghai (CN)

( * ) Notice: Subject to any disclaimer, the term of this patent is extended or adjusted under 35 U.S.C. 154(b) by 0 days.

(21) Appl. No.: 18/601,078

(22) Filed: Mar. 11, 2024

(65) Prior Publication Data

US 2025/0124863 A1 Apr. 17, 2025

(30) Foreign Application Priority Data

Oct. 12, 2023 (CN) ......................... 202311323086.7

(51) Int. Cl.
*G09G 3/3233* (2016.01)
*G09G 3/3266* (2016.01)
*G09G 3/3275* (2016.01)

(52) U.S. Cl.
CPC ......... *G09G 3/3233* (2013.01); *G09G 3/3266* (2013.01); *G09G 3/3275* (2013.01); *G09G 2310/08* (2013.01); *G09G 2320/0247* (2013.01)

(58) Field of Classification Search
None
See application file for complete search history.

(56) References Cited

U.S. PATENT DOCUMENTS

| | | | | |
|---|---|---|---|---|
| 2020/0320937 | A1* | 10/2020 | Yang | G09G 3/3258 |
| 2021/0193022 | A1* | 6/2021 | Xuan | G09G 3/3233 |
| 2021/0233477 | A1* | 7/2021 | Li | G09G 3/3283 |
| 2021/0349599 | A1* | 11/2021 | Chen | G06F 3/04166 |
| 2022/0036814 | A1* | 2/2022 | Hwang | G09G 3/3233 |

(Continued)

FOREIGN PATENT DOCUMENTS

CN 113192455 A 7/2021

*Primary Examiner* — Lunyi Lao
*Assistant Examiner* — Donna V Bocar
(74) *Attorney, Agent, or Firm* — Anova Law Group, PLLC

(57) ABSTRACT

Display panel and display device are provided. The display panel includes a base substrate; a plurality of pixel circuits, on a side of the base substrate; and light-emitting elements electrically connected to the plurality of pixel circuits. A pixel circuit of the plurality of pixel circuits includes a driving transistor; a first transistor, connected in series between the driving transistor and the data line, transmitting a data signal to the driving transistor in response to a first scanning signal; a second transistor, electrically connected between the driving transistor and a light-emitting element of the light-emitting elements, and transmitting a driving current to the light-emitting element of the light-emitting elements in response to a light-emitting control signal; a first capacitor; and the first node, on a side of the second plate of the first capacitor away from the base substrate.

15 Claims, 13 Drawing Sheets

(56) References Cited

U.S. PATENT DOCUMENTS

| | | | | |
|---|---|---|---|---|
| 2023/0169928 | A1* | 6/2023 | Eun | G09G 3/3233<br>345/204 |
| 2023/0215364 | A1* | 7/2023 | Lim | G09G 3/3266<br>345/691 |
| 2024/0203364 | A1* | 6/2024 | Park | G09G 3/3291 |
| 2024/0224630 | A1* | 7/2024 | Jung | G09G 3/3233 |
| 2024/0379066 | A1* | 11/2024 | Zhu | G09G 3/3275 |

* cited by examiner

DISPLAY PANEL WITH IMPROVING FLICKERING PROBLEM IN LOW FREQUENCY MODE, AND DISPLAY DEVICE

CROSS-REFERENCE TO RELATED APPLICATION

This application claims priority of Chinese Patent Application No. 202311323086.7, filed on Oct. 12, 2023, the entire contents of which are hereby incorporated by reference.

FIELD OF THE DISCLOSURE

The present disclosure generally relates to the field of display technology and, more particularly, relates to a display panel and a display device.

BACKGROUND

Organic light emitting diode (OLED) has characteristics of self-illumination, fast response, wide color gamut, large viewing angle, and high brightness. OLEDs can be applied to produce thin display devices and flexible display devices and have gradually become a focus in current display technology research. OLEDs require current for driving pixels. When an OLED is applied in the display field, a driving transistor in a pixel circuit is controlled to supply a driving current for the OLED to emit light. A stable driving current needs to be supplied to the OLED to ensure display performance in the application. Active-matrix organic light emitting diode (AMOLED) display panels, with wider viewing angles, higher refresh frequencies and thinner sizes, have become a research hotspot in the field of display technology.

Pixels in an AMOLED display panel include pixel drive circuits. A driving transistor in a pixel drive circuit can generate a driving current, and a light-emitting element emits light in response to the driving current. The driving current generated by the driving transistor is related to a voltage of a gate of the driving transistor.

AMOLED display panels are widely used in various display scenarios. To minimize power consumption, a low-frequency display mode of an AMOLED display panel is used to increase battery life in certain display scenarios where high image quality is not required. However, the low-frequency display mode of the AMOLED display panel exhibits flickering, and extended use may lead to vision damage. Therefore, an urgent solution is required to offer a display panel that can improve the flickering problem in the low frequency mode of the AMOLED display panel.

BRIEF SUMMARY OF THE DISCLOSURE

One aspect of the present disclosure provides a display panel. The display panel includes a base substrate; a plurality of pixel circuits, on a side of the base substrate; and light-emitting elements electrically connected to the plurality of pixel circuits. A pixel circuit of the plurality of pixel circuits includes a driving transistor, a gate of the driving transistor being electrically connected to a first node and providing a driving current for a light-emitting element of the light-emitting elements; a first transistor, connected in series between the driving transistor and the data line, transmitting a data signal to the driving transistor in response to a first scanning signal; a second transistor, electrically connected between the driving transistor and the light-emitting element of the light-emitting elements, and transmitting a driving current to the light-emitting element of the light-emitting elements in response to a light-emitting control signal; a first capacitor, a first plate of the first capacitor being electrically connected to the first node, a second plate of the first capacitor being electrically connected to a voltage line of the first power supply; and the first node, on a side of the second plate of the first capacitor away from the base substrate. The plurality of pixel circuits is arranged in M rows and N columns, N≥2, and M≥2. A data line transmits a data signal, in a display area scanning period, at least one data signal includes a first level V1, in a front and rear corridor period, the at least one data signal includes a second level V2, and V1≠V2.

Another aspect of the present disclosure provides a display device including a display panel. The display panel includes a base substrate; a plurality of pixel circuits, on a side of the base substrate; and light-emitting elements electrically connected to the plurality of pixel circuits. A pixel circuit of the plurality of pixel circuits includes a driving transistor, a gate of the driving transistor being electrically connected to a first node and providing a driving current for a light-emitting element of the light-emitting elements; a first transistor, connected in series between the driving transistor and the data line, transmitting a data signal to the driving transistor in response to a first scanning signal; a second transistor, electrically connected between the driving transistor and the light-emitting element of the light-emitting elements, and transmitting a driving current to the light-emitting element of the light-emitting elements in response to a light-emitting control signal; a first capacitor, a first plate of the first capacitor being electrically connected to the first node, a second plate of the first capacitor being electrically connected to a voltage line of the first power supply; and the first node, on a side of the second plate of the first capacitor away from the base substrate. The plurality of pixel circuits is arranged in M rows and N columns, N≥2, and M≥2. A data line transmits a data signal, in a display area scanning period, at least one data signal includes a first level V1, in a front and rear corridor period, the at least one data signal includes a second level V2, and V1≠V2.

Other aspects of the present disclosure can be understood by a person skilled in the art in light of the description, the claims, and the drawings of the present disclosure.

BRIEF DESCRIPTION OF THE DRAWINGS

Accompanying drawings, which are incorporated in and constitute a part of the specification, illustrate embodiments of the present disclosure and, together with the description, serve to explain the principles of the present disclosure.

DETAILED DESCRIPTION

Various exemplary embodiments of the present disclosure will be described in detail with reference to the accompanying drawings. It should be noted that, unless specifically stated otherwise, a relative arrangement of components and steps, numerical expressions and numerical values set forth in the embodiments do not limit the scope of the present disclosure.

The following description of at least one exemplary embodiment is merely illustrative and is not intended to limit the present disclosure and application or use thereof.

Techniques, methods, and apparatus known to a person skilled in the art may not be discussed in detail, but where appropriate, such techniques, methods, and apparatus should be considered as part of the present specification.

In all examples shown and discussed herein, any specific value should be construed as illustrative only and not as a limitation. Accordingly, other examples of exemplary embodiments may have different values.

It should be noted that similar numerals and letters refer to similar items in the following accompanying drawings. Once an item is defined in one accompanying drawing, the item does not require further discussion in subsequent accompanying drawings.

Figure 1:
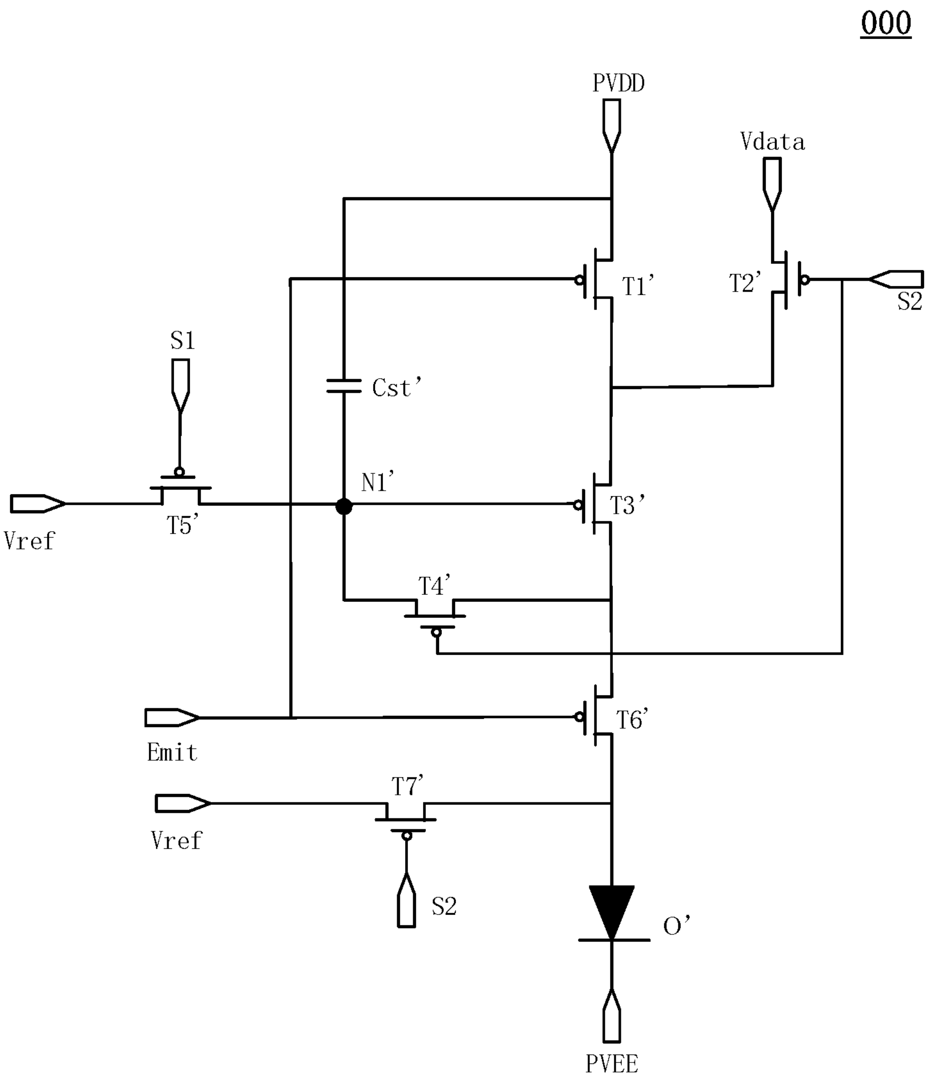
FIG. 1 illustrates a pixel circuit structure of a display panel.
Figure 2:
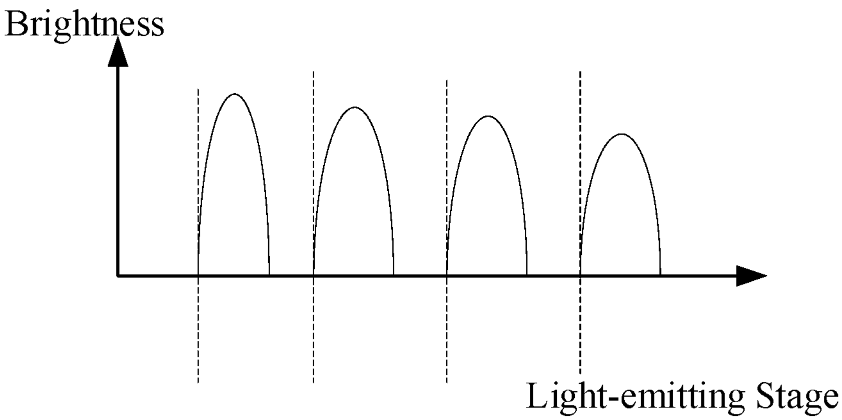
FIG. 2 illustrates a brightness change diagram of a plurality of driving cycles.

FIG. 1 illustrates a pixel circuit structure of a display panel. FIG. 2 illustrates a brightness change diagram of a plurality of driving cycles. A pixel driving circuit 000 shown in FIG. 1 includes a first transistor T1', a control end of the first transistor T1' being electrically connected to an input end of a light-emitting signal, a first end of the first transistor T1' being electrically connected to a signal end PVDD of a first power supply, and a second end of the first transistor T1' being electrically connected to a first end of a driving transistor T3'; a second transistor T2', a control end of the second transistor T2' being electrically connected to an input end S2' of a second scanning signal, a first end of the second transistor T2' being electrically connected to an input end of a data signal Vdata, and a second end of the second transistor T2' being electrically connected to the first end of the driving transistor T3'; the driving transistor T3, a control end of the driving transistor T3' being electrically connected to a second end of a fourth transistor T5', and the first end of the driving transistor T3' being electrically connected to the second end of the first transistor T1' and the second end of the second transistor T2'; a third transistor T4', a control end of the third transistor T4' being electrically connected to the input end S2'*of* the second scanning signal, a first end of the third transistor T4' being electrically connected to the second end of the fourth transistor T5' and a second plate of a storage capacitor Cst', and a second end of the third transistor T4' being electrically connected to a second end of the driving transistor T3' and a first end of a fifth transistor T6'; the fourth transistor T5', a control end of the fourth transistor T5' being electrically connected to an input end S1' of a first scanning signal, a first end of the fourth transistor T5' being electrically connected to an input end Vref of a reference voltage signal, and the second end of the fourth transistor T5' being electrically connected to the control end of the driving transistor T3; the fifth transistor T6', a control end of the fifth transistor T6' being electrically connected to an input end "Emit" of a light-emitting signal, the first end of the fifth transistor T6' being electrically connected to the second end of the driving transistor T3 and the second end of the third transistor T4', and a second end of the fifth transistor T6' being electrically connected to an anode of a light-emitting element O"; a sixth transistor T7', a control end of the sixth transistor T7' being electrically connected to an input end of the second scanning signal, a first end of the sixth transistor T7' being electrically connected to the input end Vref of the reference voltage signal, and a second end of the sixth transistor T7' being electrically connected to a first end of the light-emitting element O'; the light-emitting element O', the first end of the light-emitting element O' being electrically connected to the second end of the fifth transistor T6' and the second end of the sixth transistor T7', and a second end of the light-emitting element O' being electrically connected to a signal end PVEE of a second power supply; and a storage capacitor Cst', a first end of the storage capacitor Cst' being electrically connected to the signal end PVDD of the first power supply, and a second end of the storage capacitor Cst' being electrically connected to the control end of the driving transistor T3, the first end of the third transistor T4', and the second end of the fourth transistor T5'. The third transistor T4' and the fourth transistor T5' are both connected to the control end of the driving transistor T3'. In the light-emitting stage of a driving cycle, due to a voltage difference between the first end and the second end of the third transistor T4' and a voltage difference between the first end and the second end of the fourth transistor T5', the third transistor T4' and the fourth transistor T5' will generate leakage current over time. Therefore, a voltage of the control terminal of the driving transistor T3' electrically connected to the third transistor T4' and the fourth transistor T5' is unstable. As a voltage difference $^{\Delta}$V between a gate and a source of the driving transistor T3 decreases, an opening degree of the driving transistor T3' decreases, leading to a reduction in driving current. Therefore, brightness of the light-emitting element will decrease in the light-emitting stage. As shown in FIG. 2, when the display panel uses a pulse width modulation to adjust brightness and displays a frame, the display panel goes through a plurality of light-emitting stages, and the brightness of the plurality of light-emitting stages decreases regularly, leading to an issue of picture flickering.

The present disclosure provides a display panel and a display device to address the issue of screen flickering on the display panel. Specific embodiments of the display panel will be described in detail below.

Figure 3:
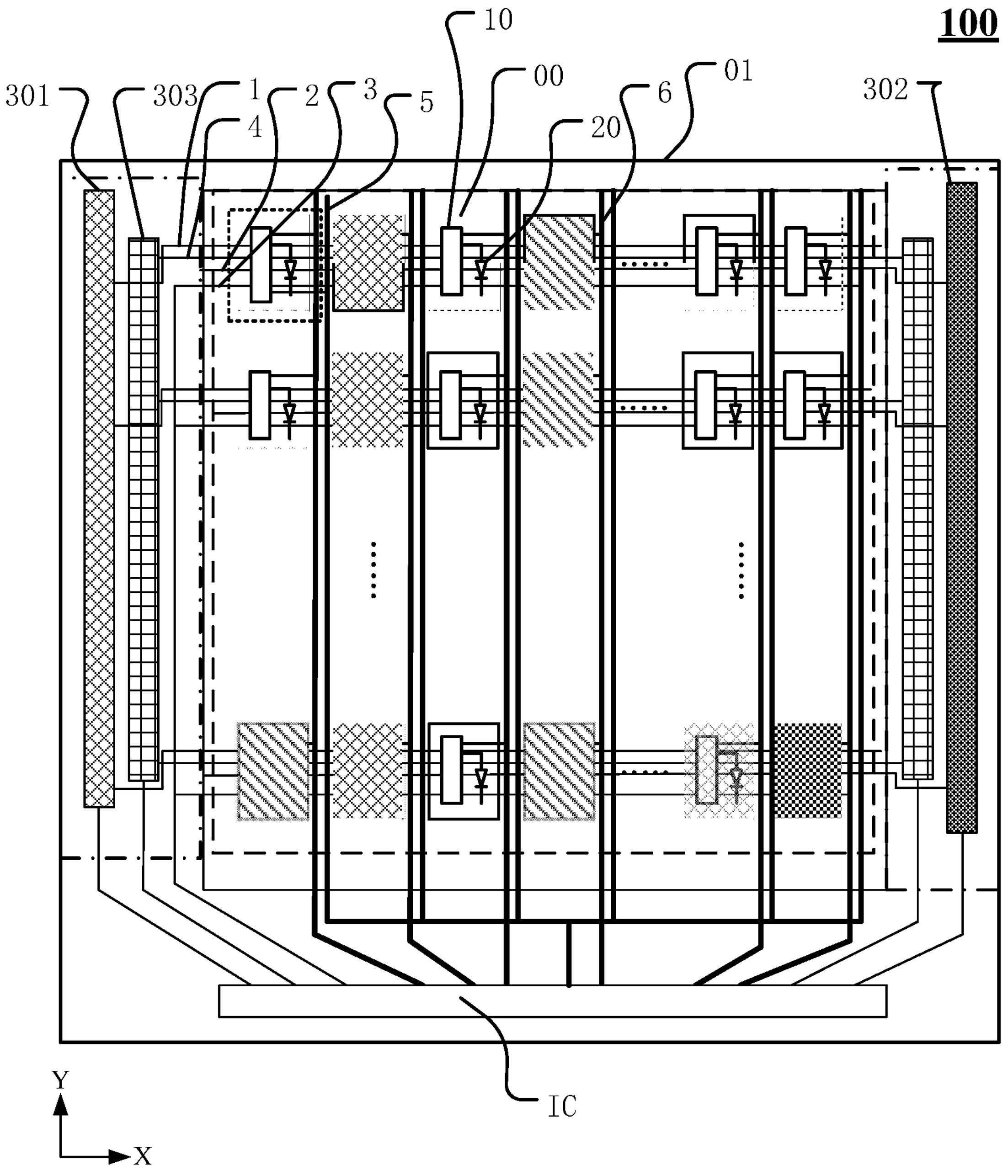
FIG. 3 illustrates a schematic diagram of a display panel consistent with various embodiments of the present disclosure.
Figure 4:
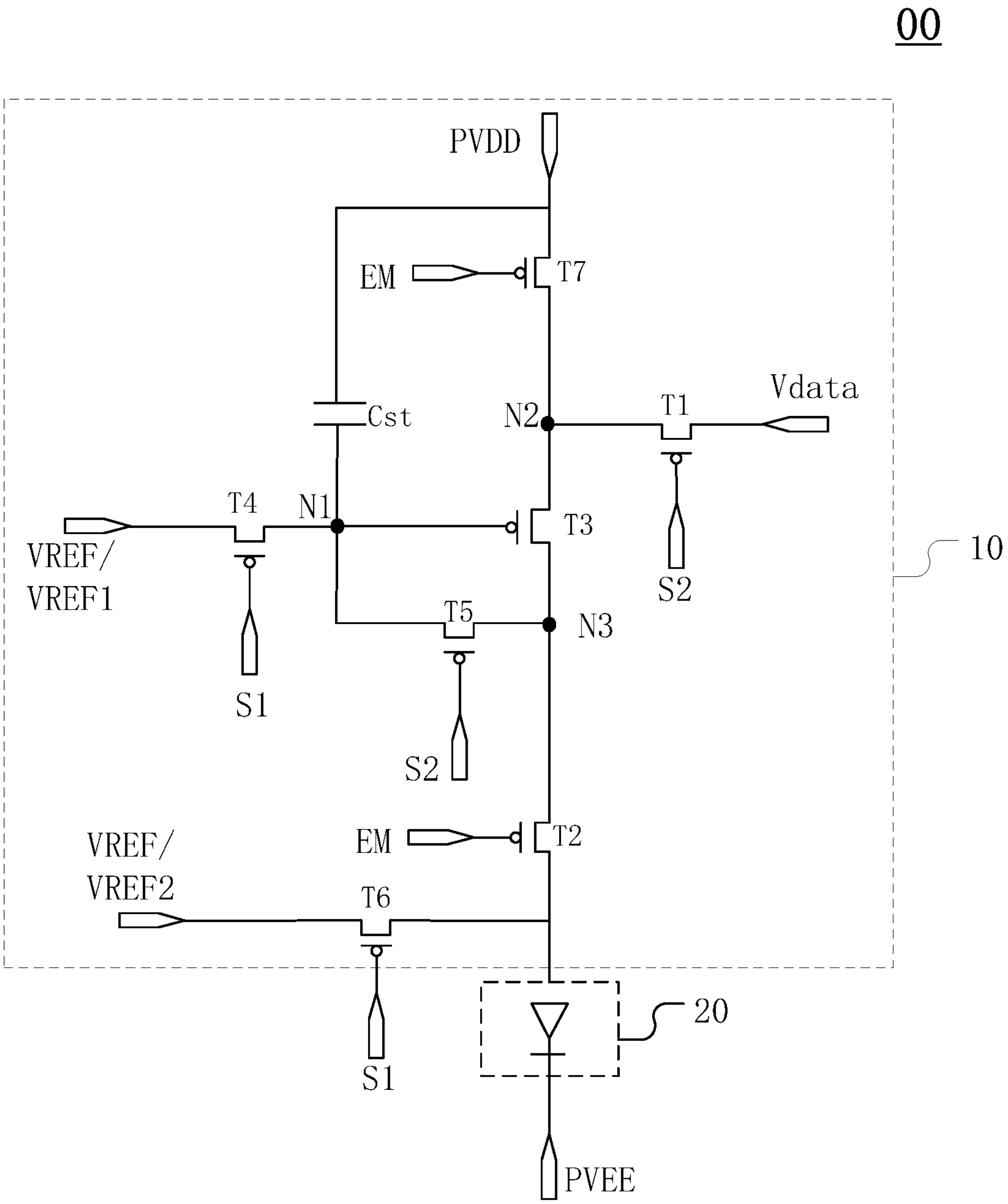
FIG. 4 illustrates a schematic diagram of a pixel circuit shown in FIG. 3.
Figure 5:
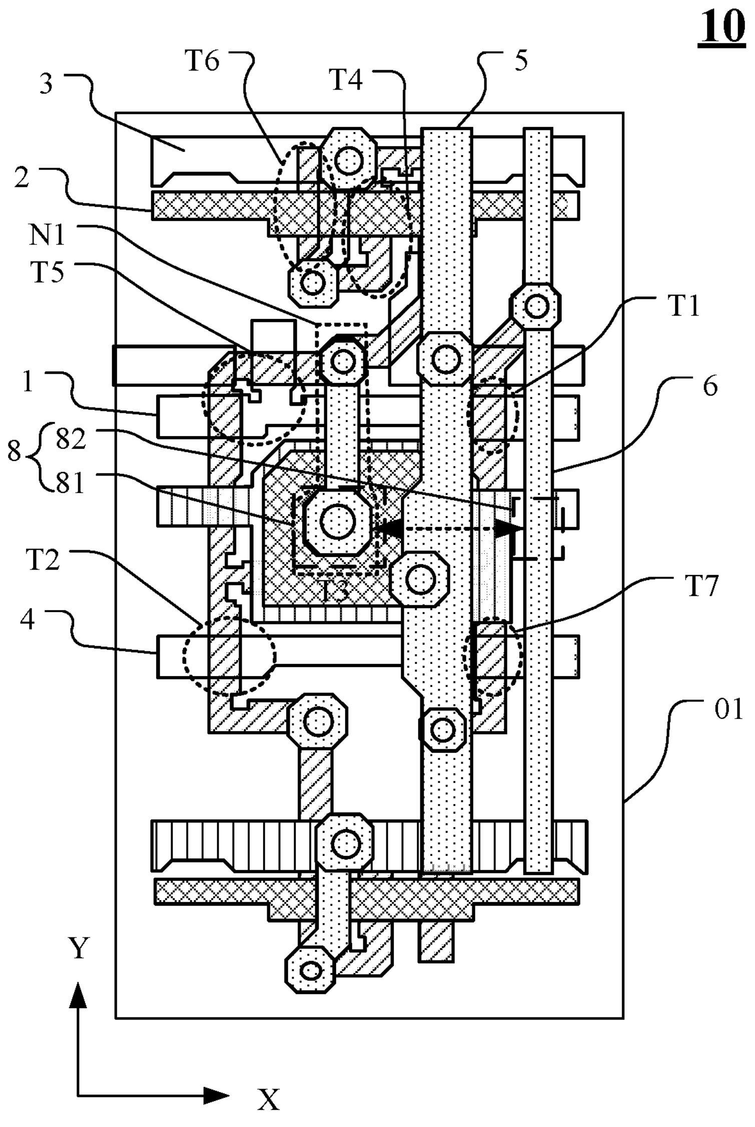
FIG. 5 illustrates a layout diagram of a pixel circuit consistent with various embodiments of the present disclosure.
Figure 6:
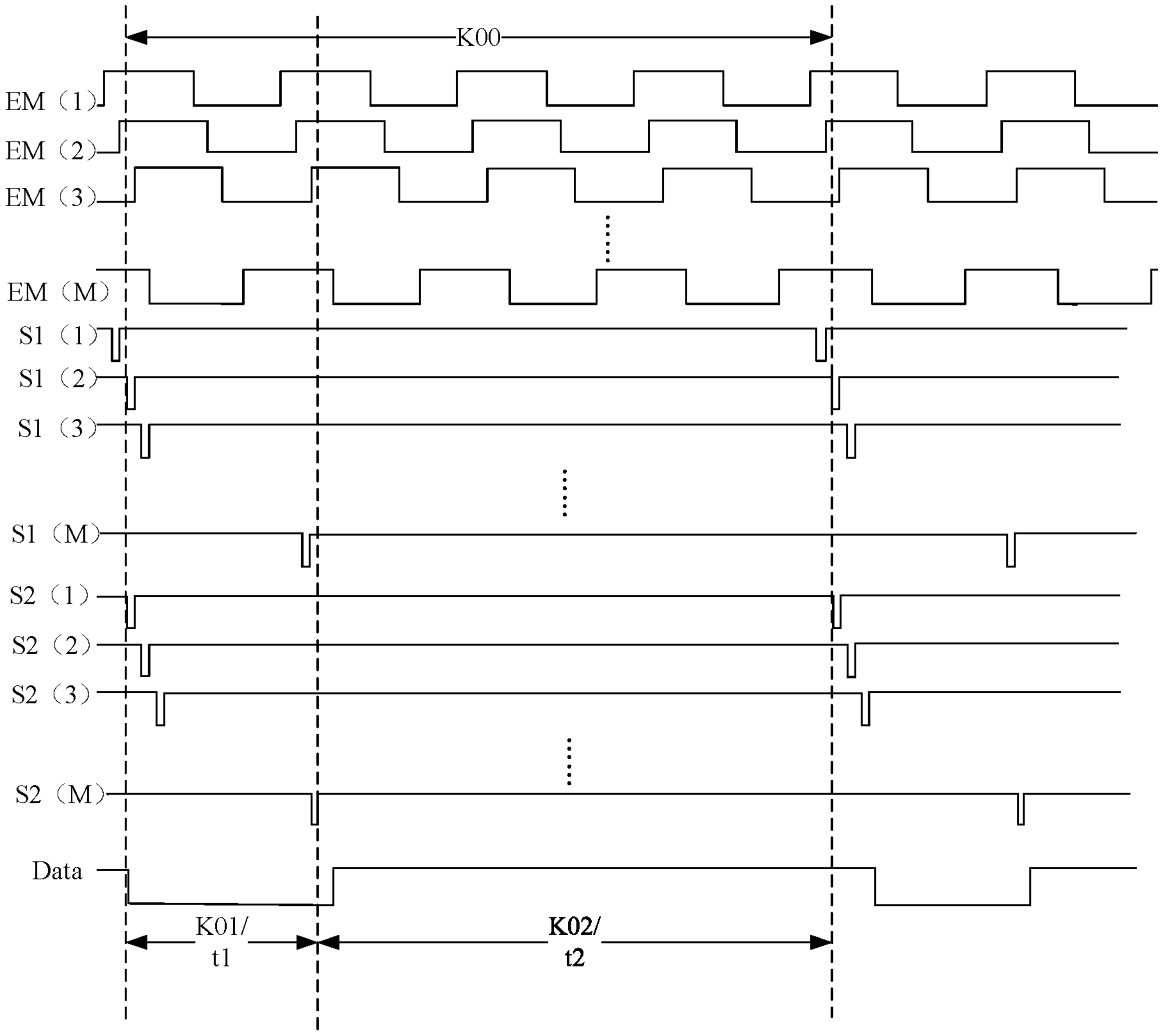
FIG. 6 illustrates a driving timing diagram of a display panel consistent with various embodiments of the present disclosure.

FIG. 3 illustrates a schematic diagram of a display panel consistent with various embodiments of the present disclosure. FIG. 4 illustrates a schematic diagram of a pixel circuit shown in FIG. 3. FIG. 5 illustrates a layout diagram of a pixel circuit consistent with various embodiments of the present disclosure. FIG. 6 illustrates a driving timing diagram of a display panel consistent with various embodiments of the present disclosure. As shown in FIG. 3, in one embodiment, a display panel 100 includes a base substrate 01, a plurality of pixel circuits 10 on one side of the base substrate 01, and light-emitting elements 20 electrically connected to the plurality of pixel circuits 10.

Referring to FIG. 4 and FIG. 5, the pixel circuit 10 includes a driving transistor T3, a gate of the driving transistor T3 being electrically connected to a first node N1 and supplying a driving current for a light-emitting element 20; a first transistor T1, connected in series between the driving transistor T3 and a data line 6 and transmitting the data signal Vdata transmitted by the data line 6 to the driving transistor T3 in response to a first scanning signal S2; a second transistor T2, electrically connected between the driving transistor T3 and the light-emitting element 20 and transmitting a driving current to the light-emitting element 20 in response to a light-emitting control signal EM; a first capacitor Cst, a first plate of the first capacitor Cst being electrically connected to the first node N1, a second plate of the first capacitor Cst being electrically connected to a voltage line 5 of the first power supply. The first node N1 is on a side of the second plate of the first capacitor Cst away from the substrate. A driving cycle K00 of the display panel 100 includes a display area scanning period K01 and a front and rear corridor period K02. The plurality of pixel circuits 10 are arranged in M rows and N columns, N≥2 and M≥2. The data line 6 transmits the data signal Vdata. In the display area scanning period K01, at least one data signal Vdata includes a first level V1. In the front and rear corridor period K02, the data signal Vdata includes a second level V2, and V1≠V2.

Specifically, in the embodiment, the display panel 100 may be an organic light-emitting display panel 100 or may be another type of display panel 100 that controls the driving transistor T3 in the pixel circuit 10 to supply a driving current so that the light-emitting element 20 emits light. The light-emitting element 20 can be an organic light-emitting diode. Alternatively, in some other optional embodiments, the light-emitting element 20 can also be a micro-light emitting diode or a sub-millimeter light-emitting diode, which is not limited herein. As an example, in the embodiment, the display panel 100 is illustrated as an organic light-emitting diode display panel.

In one embodiment, the display panel 100 includes a plurality of pixel circuit rows, and each pixel circuit row includes a plurality of pixel circuits 10. Optionally, in one embodiment, the plurality of pixel circuits 10 can be arranged in an array, that is, N pixel circuits 10 are arranged along a first direction X to form a pixel circuit row, and M pixel circuit rows are arranged along a second direction Y. A plurality of pixel circuits 10 are arranged along the second direction Y to form a pixel circuit column. The first direction X and the second direction Y can be understood as intersecting or perpendicular to each other in a direction parallel to a plane where the display panel 100 is located. In some other optional embodiments, light-emitting elements of a plurality of sub-pixels 00 in the display panel 100 can also be arranged in alternative configurations, such as a diamond arrangement, in which the pixel circuits 10 are arranged in a row, and the corresponding light-emitting elements 20 are arranged in two rows, with misalignments between the pixel circuits 10 and the light-emitting elements 20. One embodiment shown in FIG. 3 uses the array arrangement of the plurality of sub-pixels 00 as an illustrative example. The display panel 100 scans the pixel circuit rows row by row when the display panel 100 is driven.

The display panel 100 also includes light-emitting elements 20 electrically connected to the pixel circuits 10. The pixel circuits 10 are configured to control the light-emitting elements 20 to emit light. Since the light-emitting elements 20 in the organic light-emitting diode display panel 100 can generally be organic light-emitting diodes driven by current, corresponding pixel circuits 10 needs to be arranged to supply driving currents to the light-emitting elements 20 to emit light.

FIG. 3 shows a first scanning signal line 1, a second scanning signal line 2, a reset signal line 3, a voltage line 5 of the first power supply, and a light-emitting control signal line 4. Referring to FIGS. 3-6, the first scanning signal line 1 is configured to transmit the first scanning signal S2, and the first transistor T1 is turned on in response to a valid signal from the first scanning signal S2. The second scanning signal line 2 is configured to transmit the second scanning signal S1. The reset signal line 3 transmits a reset signal VREF, and the light-emitting control signal line 4 transmits the light-emitting control signal EM. A first gate driving circuit 301, a second gate driving circuit 302 and a third gate driving circuit 303 are also shown in FIG. 3. A driving chip IC sends a start signal STV_S1 (not shown) to a first stage of the first gate driving circuit 301, which provides the second scanning signal S1 to the pixel circuit 10 step by step. The driving chip IC sends a start signal STV_S2 (not shown) to a first stage of the second gate driving circuit 302, which provides the first scanning signal S2 to the pixel circuit 10 step by step. The driving chip IC sends a start signal STV_E (not shown) to a first stage of the third gate driving circuit 303, which provides the light-emitting control signal EM to the pixel circuit 10 step by step. The voltage line 5 of first power supply provides a first power supply voltage VPvdd, a second power supply voltage VPvee, and a reset signal VREF to the pixel circuit, which may also be supplied by the driving chip IC.

In FIG. 4 and FIG. 5, the pixel circuit 10 includes a third transistor T4, a fourth transistor T5, a fifth transistor T6, and a sixth transistor T7. When the third transistor T4 is turned on, the gate of the driving transistor T3 is reset. When the fourth transistor T5 and the first transistor T1 are turned on, threshold compensation is performed on the driving transistor T3. The fifth transistor T6 is connected in series between a reset signal end and the light-emitting element 20 to reset an anode of the light-emitting element 20. The sixth transistor T7, connected between a voltage end PVDD of the first power supply and a second node N2, regulates a conduction between the voltage end PVDD of the first power supply and the second node N2.

In FIG. 4, the first transistor T1, the second transistor T2 and the driving transistor T3 are P-type transistors, shown as an example for schematic explanation. The first transistor T1, the second transistor T2 and the driving transistor T3 may also be N-type transistors. When the first transistor T1 is a P-type transistor, the first transistor T1 is turned on when the valid signal from the first scanning signal S2 is at a low voltage. When the first transistor T1 is an N-type transistor, the first transistor T1 is turned on when the valid signal from the first scanning signal S2 is at a high voltage. Similarly, when the second transistor T2 is a P-type transistor, the second transistor T2 is turned on when the valid signal from the second scanning signal S1 is at a low voltage. When the second transistor T2 is an N-type transistor, the second transistor T2 is turned on when the valid signal from the second scanning signal S1 is at a high voltage. For example, if the driving transistor T3 is a P-type transistor, when the third transistor T4 is turned on, a reset signal is transmitted to the gate of the driving transistor T3. The reset signal can be at a low voltage to reset the gate of the driving transistor T3. If the driving transistor T3 is an N-type transistor, when the third transistor T4 is turned on, the reset signal is transmitted to the gate of the driving transistor T3, and the reset signal may be at a high voltage.

As shown in FIG. 3, a plurality of pixel circuits 10 are arranged in M rows and N columns, where N≥2 and M≥2. Referring to FIG. 3 and FIG. 6, a driving cycle K00 of the display panel of the present disclosure includes a display area scanning period K01 and a front and rear corridor period K02. In the display area scanning period K01, the second gate driving circuit 302 sequentially transmits corresponding first scanning signals S2 to a plurality of first scanning lines and scans each row of pixel circuits 10 row by row. That is, the first scanning signals S2 are written into the pixel circuits 10 row by row, The first scanning signals S2 are sequentially written into the pixel circuits 10 row by row, specifically from a first to a M-th row of pixel circuits 10. Optionally, the display area scanning period K01 begins with writing the first scanning signal S2 to the pixel circuits 10 of the first row and concludes with writing the first scanning signal S2 to the M-th row of pixel circuits 10. A starting time of the display area scanning period K01 is when the data signal Vdata begins transmission to the driving transistor T3. That is, the starting time of the display area scanning period K01 is when a first scanning signal S2, corresponding to the first row of pixel circuits 10, transitions from a disabled level to an enabled level. A cut-off time of the display area scanning period K01 is when the first scanning signal S2 received by an N-th row of pixel circuits 10 transitions from an enabled level to a disabled level. The front and rear corridor period K02 of a current frame is adjacent to the display area scanning period K01. The front and rear corridor period K02 represents a duration elapsed from when the data signal is written into the M-th row of pixel circuit 10 until the first scanning signal S2 of a subsequent frame is written into the first row of pixel circuits 10. That is, in one display frame, a starting time of the front and rear corridor period K02 is when the corresponding first scanning signal S2 received by the M-th row of pixel circuit 10 transitions from the enable level to the disabled level. A cut-off time of the front and rear corridor period K02 is when the received first scanning signal S2 corresponding to the first row of pixel circuits 10 in a next display frame after the one display frame transitions from the disabled level to the enabled level.

Generally, the display panel 100 supports both high-frequency and low-frequency display modes. Frequency adjustment for a same display device is typically achieved by using a "Long V" method. As an example, the display panel 100 includes two refresh frequencies of 120 Hz and 60 Hz. "Long V" means that the refresh time of each display frame remains same at 60 Hz and 120 Hz. However, when the display panel operates at a refresh frequency of 60 Hz, each display frame includes a blank frame, and an actual display effect is equivalent to 60 Hz. The front and rear corridor period K02, known as porch period or blank period, is a remaining period after all line scans are completed in one frame. During the remaining period, the driving chip performs internal configuration and prepares a signal required for a subsequent frame. For example, when a frame is displayed at a frequency of 120 Hz, the display area scanning period in the drive cycle K00 of each display frame is denoted as M1, the porch period is represented by N1, where N1 is a preset value. When a frame is displayed at a frequency of 60 Hz, the display area scanning period in the driving cycle K00 of each display frame is denoted as M2, and the porch period is represented by N2. Therefore, within 1 second, the refresh frequency of 120 Hz is calculated as 1/(M1+N1), the refresh frequency of 60 Hz is calculated by 1/(M2+N2), where N2=M1+N1. In existing technologies, since M1 is small and usually takes up 1/100 of the time in a frame, M1 can be ignored. When M1 is ignored, the porch period with a refresh frequency of 60 Hz is approximately equal to M1. It can be understood that in existing technologies, leakage current occurs in the third transistor T4 and the fourth transistor T5, both connected to the first node N1. Therefore, a gate voltage of the driving transistor T3 is unstable, thereby decreasing a gate-source voltage of the driving transistor T3, reducing the driving current, and leading to flickering brightness of the light-emitting element 20.

In one embodiment, the data line 6 extends along the second direction Y. In existing technologies, the data signal transmitted by the data line is only written into the gate of the driving transistor T3 during a scanning stage. In the present disclosure, the data line 6 transmits data signals. In one driving cycle of the display panel, at least one data signal includes the first level V1. In the display area scanning period K01, the first transistor T1 is turned on. The first level V1 of the data signal transmitted by the data line 6 is transmitted to the driving transistor T3 for data writing and threshold capture, and $V_{N1}=V_{data}-|V_{th}|$. Moreover, in the front and rear corridor period K02, the data signal also includes the second level V2, and V2≠V1. Optionally, in the display area scanning period K01, after receiving the enable level of the first scanning signal S2, at least one pixel circuit 10 in the M-th row of pixel circuits controls the first transistor T1 to be turned on. The data signal transmitted by the data line 6 connected to the pixel circuit 10 is transmitted to the driving transistor T3. The pixel circuit 10 performs data signal writing and threshold compensation operations and the data signal transmitted to the driving transistor T3 may be at the first level V1. In a pixel circuit layout design of the present disclosure, an electric field exists between the data line 6 and the first node N1. When the signal transmitted by the data line 6 changes, a voltage of the first node N1 is affected by coupling, which in turn affects the gate voltage of the driving transistor T3. For example, when the data signal transmitted by the data line 6 transitions from the first level V1 to the second level V2, the voltage of the first node N1 may be affected, thereby changing a gate-source voltage Vgs of the driving transistor T3 and an opening degree of the driving transistor T3, further affecting the driving current generated by the driving transistor T3, and reducing an initial brightness of the light-emitting element 20 in the front and rear corridor period K02. During a same front and rear corridor period K02, brightness changes of the light-emitting element 20 at the starting and cut-off times will be less than a brightness change when the initial brightness of the light-emitting element 20 is high, so that brightness differences can be balanced, thereby mitigating the impact of leakage current on flicker, and improving the flicker problem.

In some optional embodiments, referring to FIG. 6, the total duration of the display area scanning period K01 is t1, a total duration of the front and rear corridor period K02 is t2, and t1<t2.

In existing technologies, when the display panel displays at a low frequency, if the total duration of the display area scanning period K01 is shortened and the total duration of the front and rear corridor period K02 is extended, a degree of leakage current will increase, discrepancies in brightness during the front and rear corridor period K02, which is a light-emitting maintenance stage, will be more significant, resulting in a more noticeable flicker.

In the present disclosure, when the display panel displays at a low frequency, the total duration t2 of the front and rear corridor period K02 exceeds the duration t1 of the display area scanning period K01. That is, the duration of the front and rear corridor period K02 is extended, and the time during which the light-emitting element 20 emits light is extended. Since in the front and rear corridor period K02, the signal transition on the data line couples the first node N1, when the data signal transitions from the first level V1 to the second level V2, the voltage of the first node N1 will be affected, thereby reducing the initial brightness of the light-emitting element 20 in the front and rear corridor period K02 (the light-emitting maintenance stage) and reducing the discrepancies in brightness during the front and rear corridors K02 (the light-emitting maintenance stage). The present disclosure uses the data signal transition during display area scanning period K01 and the front and rear corridor period K02 to lower the initial brightness of the light-emitting element 20 when switching from the display area scanning period K01 to the front and rear corridor period K02. By decreasing the initial brightness, compared to existing technologies where the front and rear corridor period K02 exhibit higher brightness at the starting time and lower brightness at the cut-off time during a same rear corridor period K02, the present disclosure minimizes brightness variations in the front and rear corridor period K02 at both the starting time and the cut-off time, thereby balancing brightness discrepancies and reducing flicking. The longer the K02 time in the front and rear corridor period, the better an effect on reducing flickering.

In some optional embodiments, referring to FIG. 6, t1:t2=1/3, or t1:t2=1/4; or t1:t2=1/5.

It can be understood that FIG. 6 only schematically shows situations where t1:t2=1/3, 1/4 and 1/5. The total duration t2 of the front and rear corridor period K02 is much longer than the duration t1 of the display area scanning period K01. That is, the duration for data writing is shortened, and the duration of the front and rear corridor period K02 is extended, that is, the duration for the light-emitting element 20 to keep emitting light is extended.

In existing technologies, when the display panel displays at a low frequency, if the total duration of the display area scanning period K01 is shortened and the total duration of the front and rear corridor period K02 is extended, a degree of leakage current will also increase, resulting in greater brightness discrepancies in the front and rear corridor period K02 (the light-emitting maintenance stage) and making the flicker more noticeable.

In the present disclosure, t1:t2=1/3, or t1:t2=1/4; or t1:t2=1/5, where the data writing time is shortened and the front and rear corridor period K02 is extended, that is, the total time of the front and rear corridor period K02 is extended. Despite a presence of leakage current, the data signal during the front and rear corridor period K02 exerts a coupling effect on the first node N1. The second level V2 of the data signal affects the voltage of the first node N1. The present disclosure uses the transition of data signals during the display area scanning period K01 and the front and rear corridor period K02 to reduce the initial brightness of the light-emitting elements 20 during a switch from the display area scanning period K01 to the front and rear corridor period K02. During a same front and rear corridor period K02, compared to existing technologies in which the front and rear corridor period K02 exhibit higher brightness at the starting time and lower brightness at the cut-off time, the brightness of the light-emitting element changes greatly between the starting time and the cut-off time of the front and rear corridor period K02, creating a noticeable difference that users recognize and affects the user experience. In the present disclosure, the brightness change of the light-emitting element is reduced at the starting time and the cut-off time of the front and rear corridor period K02, which improves the flicker. In existing technologies, the longer the front and rear corridor K02, the more serious the leakage current of a gate of a driving transistor. The greater the difference in brightness change of the light-emitting element 20 at the starting time and the cut-off time of the front and rear corridor period K02, the more noticeable the flicker becomes. In the present disclosure, since the initial brightness of the light-emitting element 20 in the front and rear corridor period K02 is reduced, the brightness changes of the light-emitting element 20 at the starting time and the cut-off time of the front and rear corridor period K02 are smaller, the brightness differences are minimized, and the effect of flicker reduction is enhanced.

Figure 7:
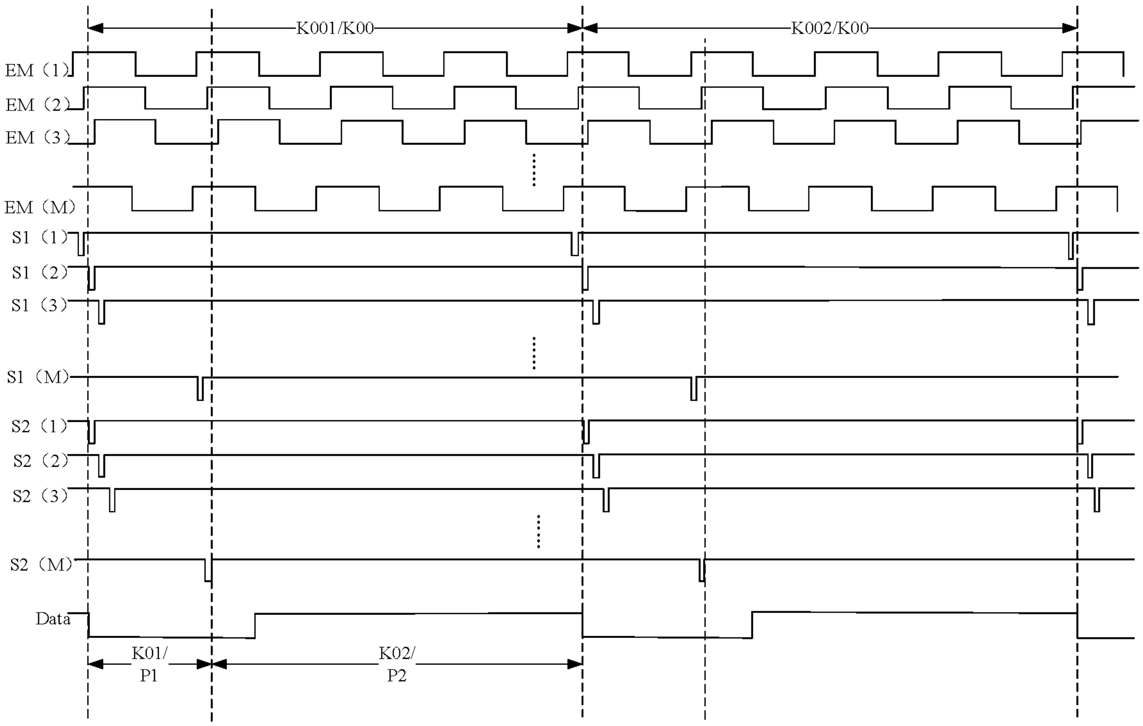
FIG. 7 illustrates another driving timing diagram of a display panel consistent with various embodiments of the present disclosure.

FIG. 7 illustrates another driving timing diagram of a display panel consistent with various embodiments of the present disclosure. In some optional embodiments, referring to FIGS. 3-5, and FIG. 7, the display panel 100 includes M rows of pixel circuits 10 arranged along the first direction X. The first scanning signal S2 may be a valid signal or an invalid signal. When the first scanning signal S2 is a valid signal, the first transistor T1 is turned on. The display panel 100 includes a first driving cycle K001 and a second driving cycle K002 adjacent to the first driving cycle K001. The starting time of the display area scanning period K01 coincides with an initiation of a valid signal of the first scanning signal S2 corresponding to the first row of the pixel circuits 10 in the first driving cycle K001. The cut-off time of the display area scanning period K01 aligns with a termination of a valid signal of the first scanning signal S2 corresponding to the M-th row of pixel circuits 10 in the first driving cycle K001. The starting time of the front and rear corridor period K02 aligns with a termination of a valid signal of the first scanning signal S2 corresponding to the M-th row of pixel circuit 10 in the first driving cycle KOOL. The cut-off time of the front and rear corridor period K02 coincides with an initiation of a valid signal of the first scanning signal S2 corresponding to the pixel circuit 10 of the first row in the second driving cycle K002.

As shown in FIG. 3, the display panel 100 includes M rows of pixel circuits 10 arranged along the first direction X. M can be a positive integer greater than or equal to 2, which is not specifically limited herein. Referring to FIG. 4 and FIG. 7, the first scanning signal S2 includes a valid signal and an invalid signal. When the first scanning signal S2 is a valid signal, the first transistor T1 is turned on. In FIG. 4, the first transistor T1 is a P-type transistor. When the first scanning signal S2 is at a low level, the first scanning signal S2 is a valid signal, the first transistor T1 is turned on, and the data signal at the first level V1 is written into the second node N2. When the first transistor T1 is an N-type transistor, the first scanning signal S2 is a valid signal when the first scanning signal S2 is at a high level, the first transistor T1 is turned on, and the data signal at first level V1 is written into the second node N2.

A plurality of pixel circuits 10 are arranged in M rows and N columns, where N≥2 and M≥2. Number of rows and columns of the pixel circuits 10 is not specifically limited herein. In the present disclosure, the driving cycle KOO of the display panel 100 includes the display area scanning period K01 and the front and rear corridor period K02. In the display area scanning period K01, the first scanning signal S2 scans and is written into each row of pixel circuits 10 row by row, that is, the first scanning signal S2 is written to the pixel circuits 10 into the first through the M-th row. The display area scanning period K01 starts with a writing of the first scanning signal S2 to the pixel circuits 10 of the first row and concludes with a writing of the first scanning signal S2 to the pixel circuits 10 of the M-th row, followed by the front and rear corridor period K02 of the current frame. The front and rear corridor period K02 is a duration starting from when the data signal is written into the M-th row of pixel circuits 10 until the first scanning signal S2 of a subsequent frame is written into the first row of pixel circuits 10.

The display panel 100 includes a first driving cycle K001 and a second driving cycle K002 adjacent to the first driving cycle K001. That is, when two adjacent frames are displayed, the first frame corresponds to the first driving cycle K001, and the second frame corresponds to the second driving cycle K002. Both the first driving cycle K001 and the second driving cycle K002 include the display area scanning period K01 and the front and rear corridor period K02. The front and rear corridor period K02 refers to the light-emitting maintenance stage. The light-emitting maintenance stage represents a remaining time after all line scans are completed in one frame, during which the chip is driven to perform internal configuration.

In the first driving cycle K001, the starting time of the display area scanning period K01 coincides with an initiation of a valid signal of the first scanning signal S2 corresponding to the pixel circuit 10 of the first row, and the cut-off time of the display area scanning period K01 aligns with a termination of a valid signal of the first scanning signal S2 corresponding to the M-th row of pixel circuits 10 in the first driving cycle K001. Similarly, for the second driving cycle K002, the starting time of the display area scanning period K01 coincides with an initiation of a valid signal of the first scanning signal S2 corresponding to the first row of the pixel circuit 10 in the second driving cycle K002, and the cut-off time of the display area scanning period K01 aligns with a termination of a valid signal of the first scanning signal S2 corresponding to the M-th row of pixel circuits 10 in the second driving cycle K002.

In the first driving cycle K001, the starting time of the front and rear corridor period K02 aligns with a termination of a valid signal of the first scanning signal corresponding to the M-th row of pixel circuits 10 (an end of a first pulse of S2 (M) as shown in FIG. 7), and the cut-off time of the front and rear corridor period K02 coincides with an initiation of a valid signal of the first scanning signal S2 corresponding to the first row of pixel circuits 10 in the second driving cycle K002 (a start of a second pulse of S2 (1) in FIG. 7). During the front and rear corridor period K02, the first frame of the display panel 100 keeps emitting light.

As described above, in existing technologies, leakage current occurs in the third transistor T4 and the fourth transistor T5, both connected to the first node N1. Therefore, a gate voltage of the driving transistor T3 is unstable, thereby decreasing a gate-source voltage of the driving transistor T3, reducing the driving current, and leading to flickering brightness of the light-emitting element 20. In the present disclosure, with reference to FIG. 7, in the front and rear corridor period K02, the data signal is at the second level V2. The coupling effect of the data line 6 on the first node N1 affects the voltage of the first node N1, thereby reducing the initial brightness of the light-emitting element 20 and minimizing the brightness differences during the front and rear corridor period K02 and improving flicker.

In one optional embodiment, referring to FIG. 7, the duration of the display area scanning period K01 is P1, and the duration of the front and rear corridor period K02 is P2, and P1/(P1+P2)≤1/4.

In one embodiment, P1/(P1+P2)≤1/4, which is equivalent to shortening the data writing time and extending the front and rear corridor period K02. That is, the duration for the light-emitting element 20 to emit light is extended. While leakage current also exists, the data signal couples to the first node N1 during the front and rear corridor period K02. The second level V2 of the data signal affects the voltage of the first node N1, thereby reducing the brightness of the light-emitting element 20 during the front and rear corridor period K02 (the light-emitting maintenance stage), minimizing the brightness differences during the front and rear corridors K02 (the light-emitting maintenance stage) and improving flicker. The longer the front and rear corridor period K02, the more obvious the coupling effect superimposed on the leakage current, and the more effective interference with flickering by the leakage current.

Figure 12:
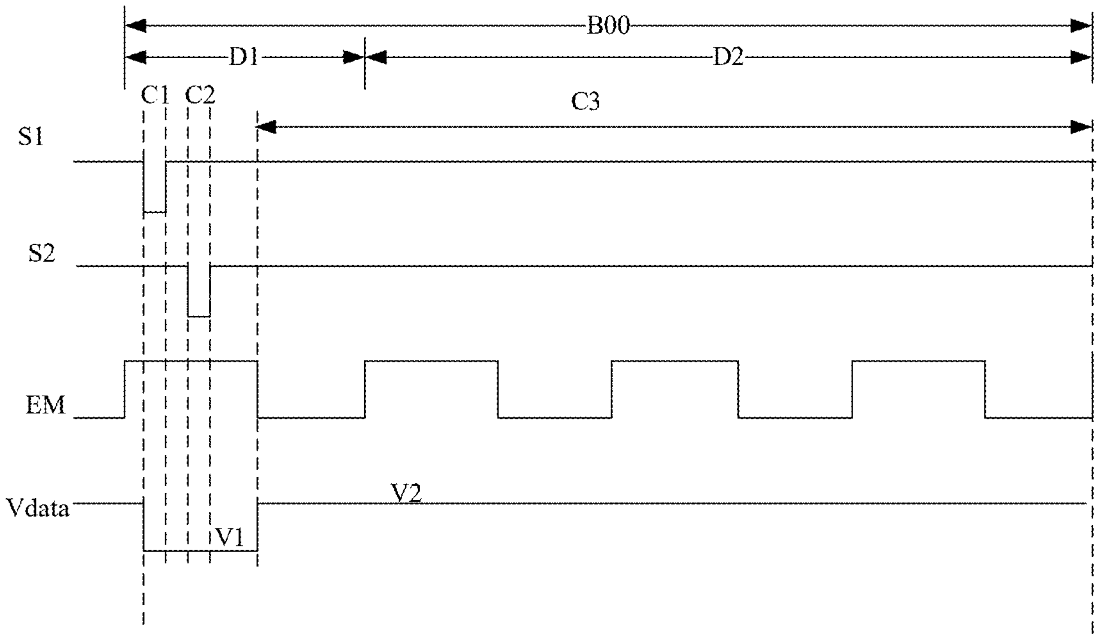
FIG. 12 illustrates a duty cycle timing diagram of a pixel circuit consistent with various embodiments of the present disclosure.

In some optional embodiments, with reference to FIGS. 3 to 7, the display panel 100 includes M rows of pixel circuits 10 and M light emitting control signal lines 4 and M is a positive integer greater than 2. A light-emitting control signal line 4 is electrically connected to a gate of the second transistor T2 and transmits the light-emitting control signal EM. FIG. 12 illustrates a duty cycle timing diagram of a pixel circuit consistent with various embodiments of the present disclosure. Referring to FIG. 12, the light-emitting control signal EM includes K valid pulses and K invalid pulses. The invalid pulses and valid pulses are alternately arranged, and K is a positive integer greater than or equal to 2. A working cycle B00 of the M-th row of pixel circuits 10 includes a data writing stage D1 and a light-emitting maintenance stage D2. The data writing stage D1 includes a first pulse group, while the light-emitting maintenance stage D2 includes a second to a K-th pulse group.

It should be noted that a working cycle B00 of the M-th row of pixel circuits 10 includes the data writing stage D1 and the light light-emitting maintenance stage D2. The data writing stage D1 includes the first pulse group, and the light-emitting maintenance stage D2 includes the second to the K-th pulse group. Optionally, the M-th row of pixel circuits 10 may be a specific row of pixel circuits in a middle or a last row of the display panel.

Referring to FIGS. 3-5, the light-emitting control signal line 4 is electrically connected to the gate of the second transistor T2. The light-emitting control signal EM is transmitted to the gate of the second transistor T2 through the light-emitting control signal line 4. The light-emitting control signal EM includes K valid pulses and K invalid pulses, and the invalid pulses and valid pulses are alternately arranged. When the light-emitting control signal EM is a valid pulse, the second transistor T2 is turned on, the driving current generated by the driving transistor T3 is transmitted to the light-emitting element 20 through the second transistor T2, and the light-emitting element 20 emits light. When the light-emitting control signal EM is an invalid pulse, the second transistor T2 is turned off, and the driving current generated by the driving transistor T3 cannot be transmitted to the light-emitting element 20 through the second transistor T2, and the light-emitting element 20 does not emit light.

Figure 8:
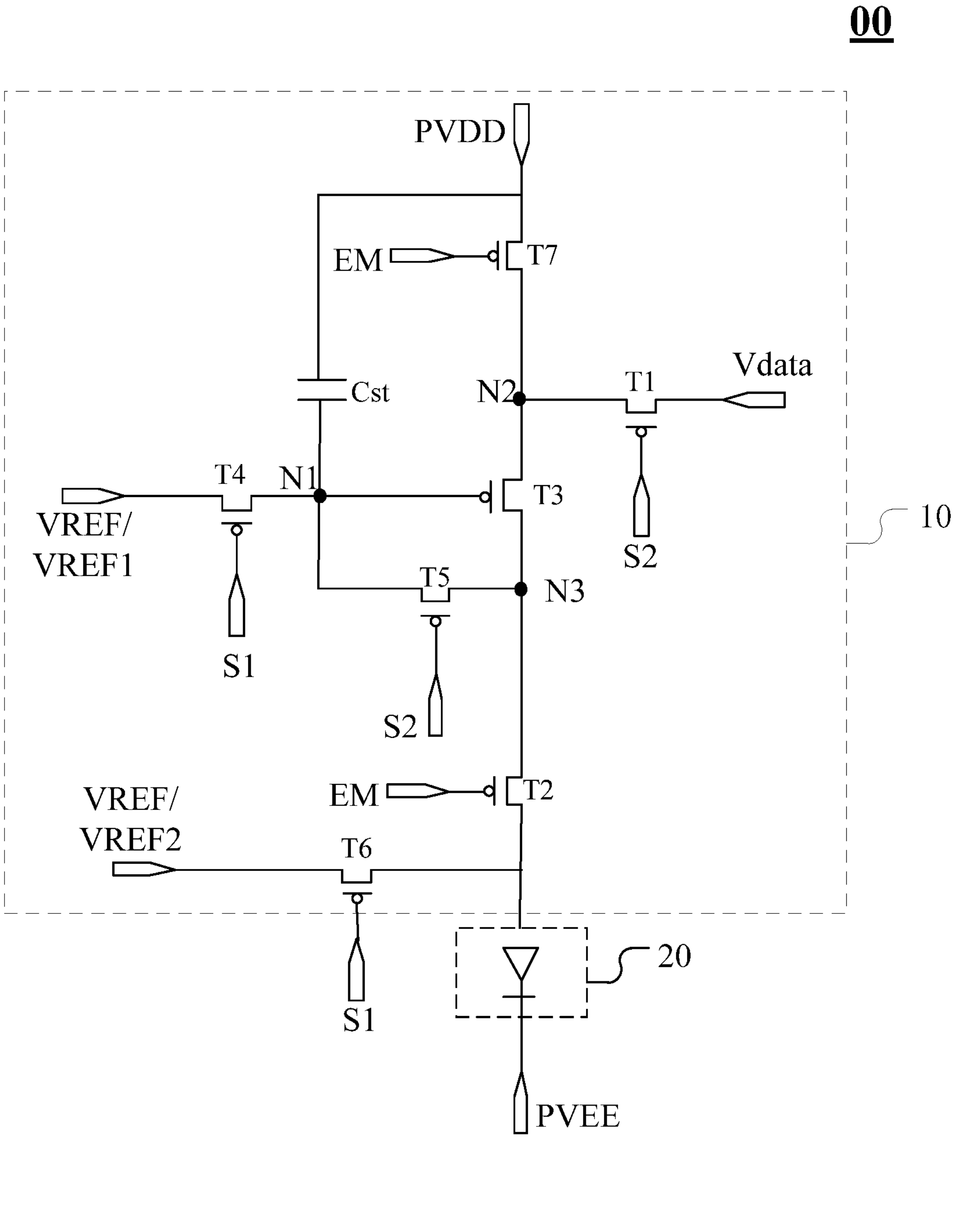
FIG. 8 illustrates another schematic diagram of a pixel circuit consistent with various embodiments of the present disclosure.
Figure 9:
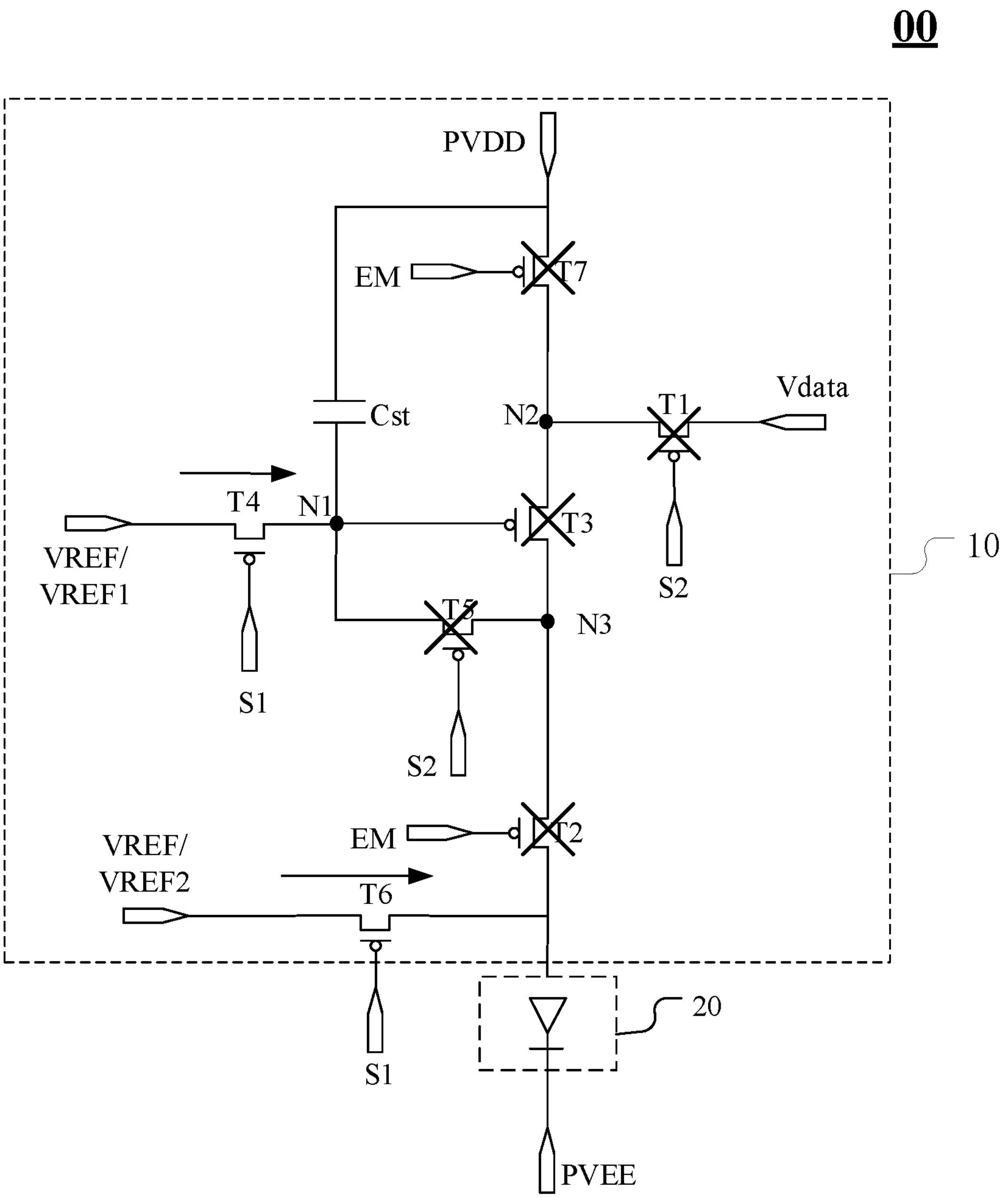
FIG. 9 illustrates a schematic diagram of a pixel circuit in a reset stage.
Figure 10:
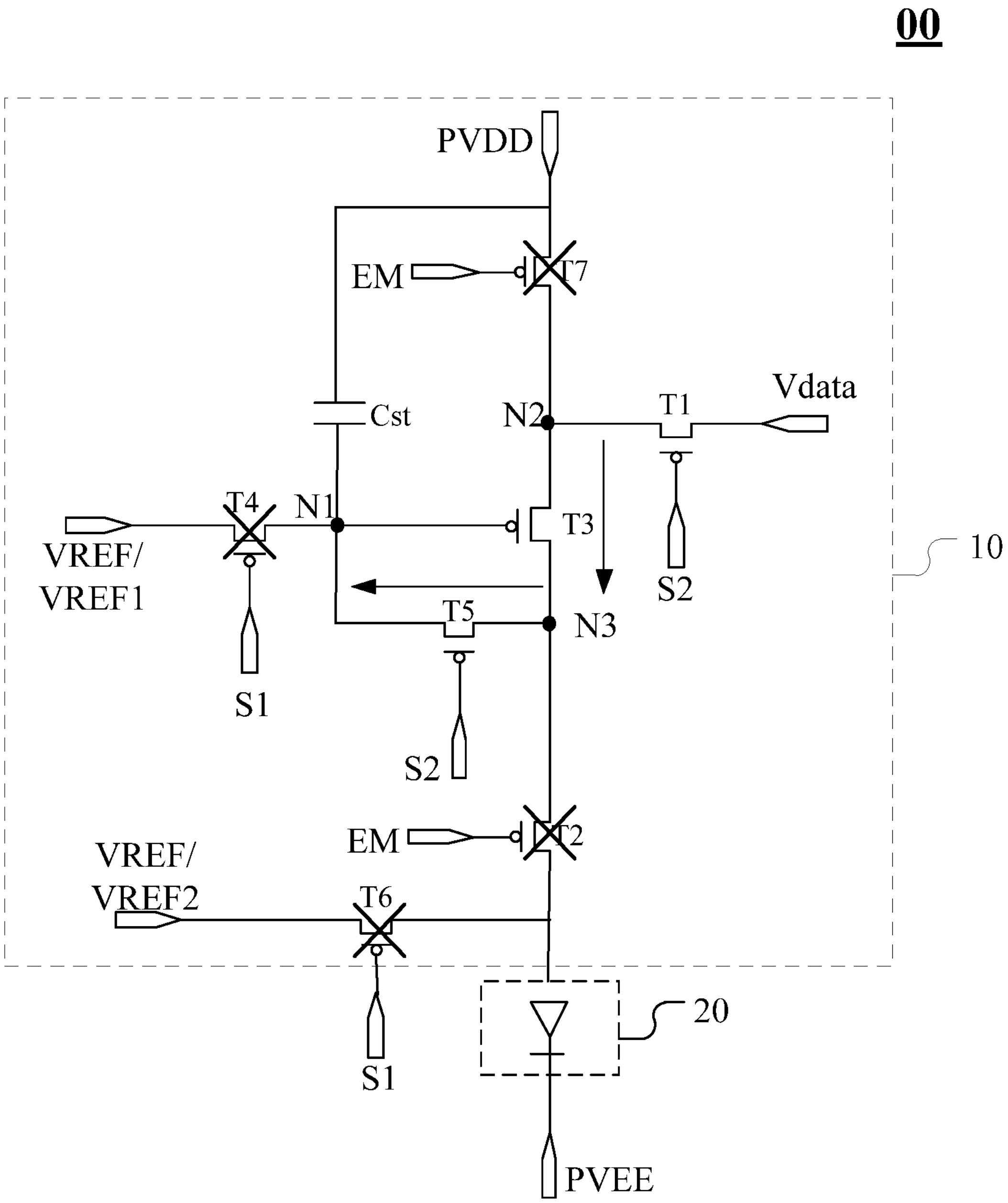
FIG. 10 illustrates a schematic diagram of a pixel circuit in a data signal writing stage.
Figure 11:
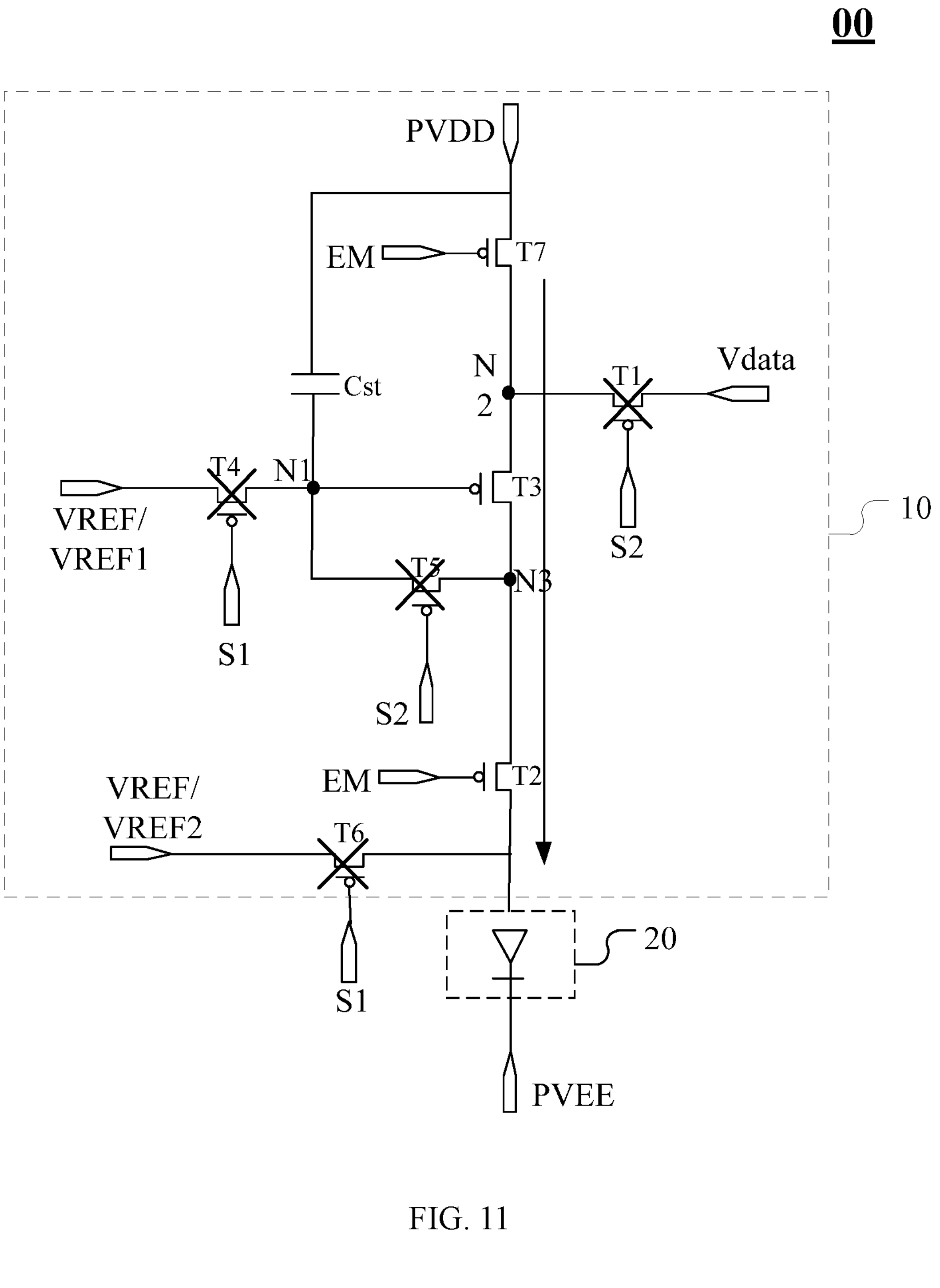
FIG. 11 illustrates a schematic diagram of a pixel circuit in a light-emitting stage.

Referring to FIGS. 8-11, a working principle of a single pixel circuit is explained. FIG. 8 illustrates another schematic diagram of a pixel circuit consistent with various embodiments of the present disclosure. FIG. 9 illustrates a schematic diagram of a pixel circuit in a reset stage. FIG. 10 illustrates a schematic diagram of a pixel circuit in a data signal writing stage. FIG. 11 illustrates a schematic diagram of a pixel circuit in a light-emitting stage. FIG. 8 also shows the fifth transistor T6 and the sixth transistor T7. The fifth transistor T6 is connected in series between the reset signal end and the anode of the light-emitting element 20 to reset the anode of the light-emitting element 20. The sixth transistor T7 is connected between the voltage end PVDD of the first power supply and the second node N2 to regulate a conduction between the voltage end PVDD of the first power supply and the second node N2.

Specifically, a first stage in a light-emitting cycle of the pixel circuits 10 is a reset stage C1. Referring to FIG. 9, the valid signal of the second scanning signal S1 controls the third transistor T4 to be turned on, the reset signal VREF is written into the first node N1, and the gate of the driving transistor T3 is initialized. The valid signal of the second scanning signal S1 controls the fifth transistor T6 to be turned on, and the reset signal VREF is written into the anode of the light-emitting element 20 to reset the anode of the light-emitting element 20. During the reset stage C1, the first transistor T1, the second transistor T2, the driving transistor T3, the fourth transistor T5 and the sixth transistor T7 are all turned off.

The reset stage C1 is followed by a data signal writing stage C2. Referring to FIG. 10, during the data signal writing stage C2, the second scanning signal S1 transmitted to a gate of the third transistor T4 is an invalid signal so that the third transistor T4 is turned off. During the reset stage C1, the reset signal VREF is written to the first node N1, turning on the driving transistor T3. The valid signal of the first scanning signal S2 is transmitted to a gate of the first transistor T1, turning on the first transistor T1. The first level V1 of the data signal Vdata is written to the first node N1, and the valid signal of the first scanning signal S2 is transmitted to a gate of the fourth transistor T5, turning one the fourth transistor T5. Therefore, the data signal Vdata is written to the first node N1 through the first transistor T1, the driving transistor T3, and the fourth transistor T5. A voltage of the second node N2 is equal to a voltage, of the data signal that is $V_{N2}=V_{data}$, the voltages of the first node N1 and the third node N3 are equal to a difference between the voltage of the data signal and a threshold voltage of the driving transistor T3, $V_{N1}=V_{N3}=V_{data}-/V_{th}/$. In the data signal writing stage C2, the second transistor T2, the third transistor T4, the fifth transistor T6 and the sixth transistor T7 are all turned off.

The data signal writing stage C2 is followed by a light-emitting stage C3. Referring to FIG. 11, the first capacitor Cst maintains the voltage of the first node N1 to ensure that the driving transistor T3 remains in a turned-on state, the second transistor T2 and the sixth transistor T7 are turned on in response to the valid signal of the light-emitting control signal EM. A current generated by the driving transistor T3 is transmitted to the light-emitting element 20, and the light-emitting element 20 emits light.

It can be understood that, in one embodiment, the data writing stage D1 includes a pulse group, consisting of both an invalid pulse and a valid pulse. When the pulse is invalid, the pixel circuits are in the reset stage C1 and the data signal writing stage C2 in the light-emitting cycle. When the pulse is valid, the pixel circuits are in the light-emitting stage C3.

In one embodiment, in the working cycle B00 of the M-th row of pixel circuits 10, the data writing stage D1 includes the first pulse group, and the light-emitting maintenance stage D2 includes the second pulse group to the K-th pulse group. A pulse group includes a valid pulse and an invalid pulse. Optionally, the brightness of the display panel is adjusted using pulse width modulation (PWM). When PWM modulates, the data writing stage D1 and the light-emitting maintenance stage D2 consist of a plurality of pulse groups. When the display panel displays at a low frequency, the high-frequency alternation between lighting and darkening of the light-emitting element can be employed to regulate the total light-emitting time of a frame, thereby controlling the brightness of the frame. It can be understood that, in the embodiment, the light-emitting maintenance stage D2 includes the second pulse group to the K-th pulse group, thereby forcing the light-emitting element 20 to flash a plurality of times. In the present disclosure, the data signal Vdata couples the voltage of the first node N1 in the light-emitting maintenance stage D2, and the gate-source voltage Vgs of the driving transistor T3 decreases. Therefore, the opening degree of the driving transistor T3 decreases, and the generated driving current decreases, thereby reducing the brightness of the light-emitting element 20. In the present disclosure, the light-emitting maintenance stage D2 includes the second pulse group to the K-th pulse group, which forces the light-emitting element 20 to flash a plurality of times. Although leakage current exists, the brightness of the light-emitting element 20 is reduced in an early stage of the light-emitting maintenance stage D2. Therefore, the brightness of the light-emitting element 20 remains relatively consistent during a plurality of flashes, which is less noticeable to human eyes and results in less obvious flashing.

Figure 13:
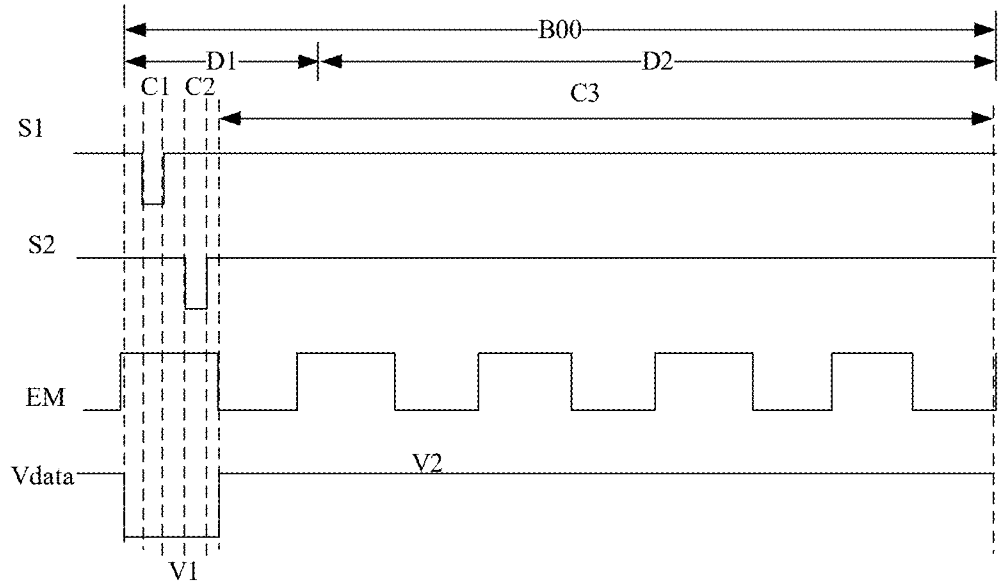
FIG. 13 illustrates another duty cycle timing diagram of a pixel circuit consistent with various embodiments of the present disclosure.
Figure 14:
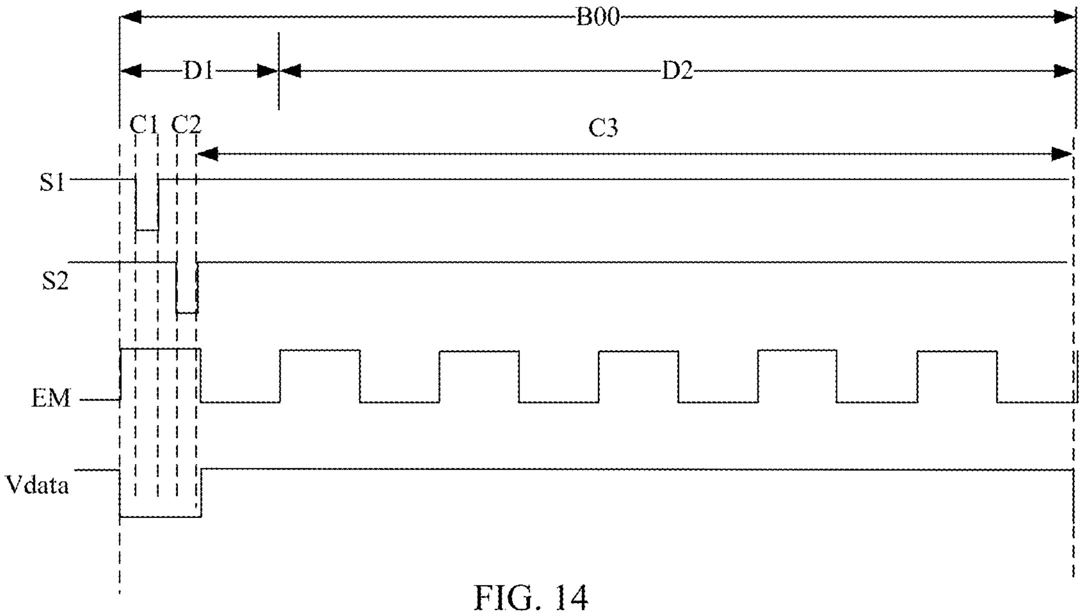
FIG. 14 illustrates another duty cycle timing diagram of a pixel circuit consistent with various embodiments of the present disclosure.

FIG. 13 illustrates another duty cycle timing diagram of a pixel circuit consistent with various embodiments of the present disclosure. FIG. 14 illustrates another duty cycle timing diagram of a pixel circuit consistent with various embodiments of the present disclosure. Referring to FIGS. 12-14, in some optional embodiments, K=4, 5 or 6.

FIG. 12 shows a case of K=4, FIG. 13 shows a case of K=5, and FIG. 14 shows a case of K=6. It can be understood that the light-emitting maintenance stage D2 includes the second pulse group to the K-th pulse group. The higher the number of K pulse groups, the greater the number of forced flashes in the light-emitting maintenance stage D2. The lower the number of K pulse groups, the less the number of forced flashes in the light-emitting maintenance stage D2. K should not be too large or too small. If K is too small, number of flashes in the light-emitting maintenance stage D2 will be insufficient, and a change in brightness may be easily noticeable to human eyes. If K is too large, a duration of the light-emitting maintenance stage D2 becomes excessive, thereby reducing a time available for data writing, leading to a deterioration of the data writing effect and insufficient frame writing, that is, a poor display effect.

In the embodiment, K=4, 5 or 6, and the K value is within a reasonable range. Number of flickers in the light-emitting maintenance stage D2 is relatively reasonable, ensuring that changes in brightness are not easily noticeable to human eyes, preventing insufficient writing of the data signal and avoiding adverse impacts on the display effect.

In some optional embodiments, referring to FIG. 3 and FIGS. 12-14, the display panel 100 includes M rows of pixel circuits 10 and M light-emitting control signal lines 4, and M is a positive integer greater than 2. A light-emitting control signal line 4 is electrically connected to the gate of the second transistor T2 and transmits the light-emitting control signal EM. The light-emitting control signal EM includes a plurality of invalid pulses and a plurality of valid pulses, and the invalid pulses and valid pulses are arranged alternately. In a working cycle B00 of the pixel circuit 10, a total duration of valid pulses is T1, a total duration of invalid pulses is T2, and 10%≤T1/(T1+T2)≤50%.

It can be understood that the display panel 100 includes M rows of pixel circuits 10 and M light emitting control signal lines 4. A light-emitting control signal line 4 is electrically connected to the gate of the second transistor T2 and transmits the light-emitting control signal EM. The light-emitting control signal EM includes a plurality of valid pulses and a plurality of invalid pulses. When the light-emitting control signal EM sends out valid pulses, the second transistor T2 is turned on. When the light-emitting control signal EM sends out invalid pulses, the second transistor T2 is not turned on. When the second transistor T2 is a P-type transistor, the valid pulses of the light-emitting control signal EM are at a low level. When the second transistor T2 is an N-type transistor, the valid pulses of the light-emitting control signal EM are at a high level. In one embodiment, as an example for schematic explanation, the second transistor T2 is a P-type transistor, the valid pulses of the light-emitting control signal EM are at a low level and the invalid pulses of the light-emitting control signal EM are at a high level.

The light-emitting maintenance stage D2 includes a plurality of valid pulses and a plurality of invalid pulses arranged alternately, in an order of valid pulse—invalid pulse—valid pulse—invalid pulse—valid pulse—invalid pulse. The light-emitting element 20 starts to emit light during a first valid pulse, while refraining from emitting light during an invalid pulse, which makes the light-emitting element 20 flicker in the light-emitting maintenance stage D2. Since the voltage of the first node N1 rises (for the driving transistor T3 is a P-type transistor) or falls (for the driving transistor T3 is an N-type transistor) due to the coupling effect with the second level of the data signal V2, the brightness of the light-emitting element 20 will be reduced, which makes the flickering less noticeable to human eyes in the light-emitting maintenance stage D2, thereby improving the problem of regular flickering of the light-emitting element 20.

In a working cycle B00 of the pixel circuit 10, a total duration of the valid pulses is T1, a total duration of the invalid pulses is T2, and 10%≤T1/(T1+T2)≤50%. That is, in the embodiment, a duty cycle of the lighting control signal EM is between 10% and 50%. Optionally, through PWM modulation, when the duty cycle is between 10% and 50%, a brightness peak becomes evident. The easier an adjustment of the brightness peak and characterization through a flicker value testing, the more evident an effect of optimizing flicker. Due to limited debugging accuracy, when using PWM to modulate the display panel, a modulation of the light-emitting control signal EM must be an integer multiple of an CK (clock signal) period associated with the light-emitting control signal EM. The smaller the duty cycle of the light-emitting control signal EM is, the shorter the pixel light-emitting time is, and the larger a space for modulating the brightness of the display panel is. For example, when the duty cycle of the lighting control signal EM is 10%, the lighting control signal EM includes four pulse groups (valid pulses and invalid pulses) with each pulse group allocated 2.5% of the duty cycle as light-emitting time. Therefore, under a condition of debugging accuracy of 0.16% [i.e., a period of the CK signal related to the light-emitting control signal EM divided by the time of one frame], the debugging has a greater impact on pulse brightness, and more obvious improvement in the flicker value.

In some optional embodiments, referring to FIGS. 12-14, in the front and rear corridor period K02, the data signal is maintained at the second level V2.

It can be understood that in the front and rear corridor period K02, the data signal remains at the second level V2, which is distinct from the first level V1. The second level V2 continues to couple with the first node N1, and the gate-source voltage Vgs of the driving transistor T3 decreases. Therefore, the opening degree of the driving transistor T3 decreases, and the generated driving current decreases, thereby reducing the brightness of the light-emitting element 20. In addition, there are a plurality of valid pulses and invalid pulses alternately arranged in the light-emitting maintenance stage D2, so that the light-emitting element 20 flash a plurality of times in the light-emitting maintenance stage D2. For a same frame, the brightness of the light-emitting element 20 in the light-emitting maintenance stage D2 is reduced and the flicker is not easily recognized by human eyes, thereby improving a regular flickering problem in different frames in the display panel 100.

In some optional embodiments, continuing to refer to FIGS. 4 and 5, the driving transistor T3 is a P-type transistor, and the first level V1 of the data signal is less than the second level V2 of the data signal. Or the driving transistor T3 is an N-type transistor, and the first level V1 of the data signal is greater than the second level V2 of the data signal.

In FIG. 4 and FIG. 5, as an example, the driving transistor T3 is taken as a P-type transistor for schematic explanation. When the driving transistor T3 is a P-type transistor, the first level V1 of the data signal is less than the second level V2 of the data signal. That is, the data signal is at a higher level in the front and rear corridor period K02, and couples to the first node N1, thereby raising the voltage of the first node N1, and reducing the gate-source voltage Vgs of the driving transistor T3. The opening degree of the driving transistor T3 decreases, and the generated driving current decreases, thereby reducing the brightness of the light-emitting element 20. In addition, in the light-emitting maintenance stage, a plurality of valid pulses and invalid pulses is arranged alternately in the light-emitting maintenance stage, so that the light-emitting element 20 flashes a plurality of times during the light-emitting maintenance stage. For a same frame, the brightness of the light-emitting element 20 in the light-emitting maintenance stage is reduced and the flicker is not easily recognized by human eyes, thereby improving the regular flickering problem in different frames in the display panel 100.

When the driving transistor T3 is an N-type transistor, the first level V1 of the data signal is less than the second level V2 of the data signal, that is, the data signal is at a higher level in the front and rear corridor period K02, and couples the first node N1, thereby raising the voltage of the first node N1, and reducing the gate-source voltage Vgs of the driving transistor T3. The opening degree of the driving transistor T3 decreases, and the generated driving current decreases, thereby reducing the brightness of the light-emitting element 20. In addition, in the light-emitting maintenance stage, a plurality of valid pulses and invalid pulses is arranged alternately in the light-emitting maintenance stage, so that the light-emitting element 20 flashes a plurality of times during the light-emitting maintenance stage. For a same frame, the brightness of the light-emitting element 20 in the light-emitting maintenance stage is reduced and the flicker is not easily recognized by human eyes, thereby improving the regular flickering problem in different frames in the display panel 100.

Figure 15:
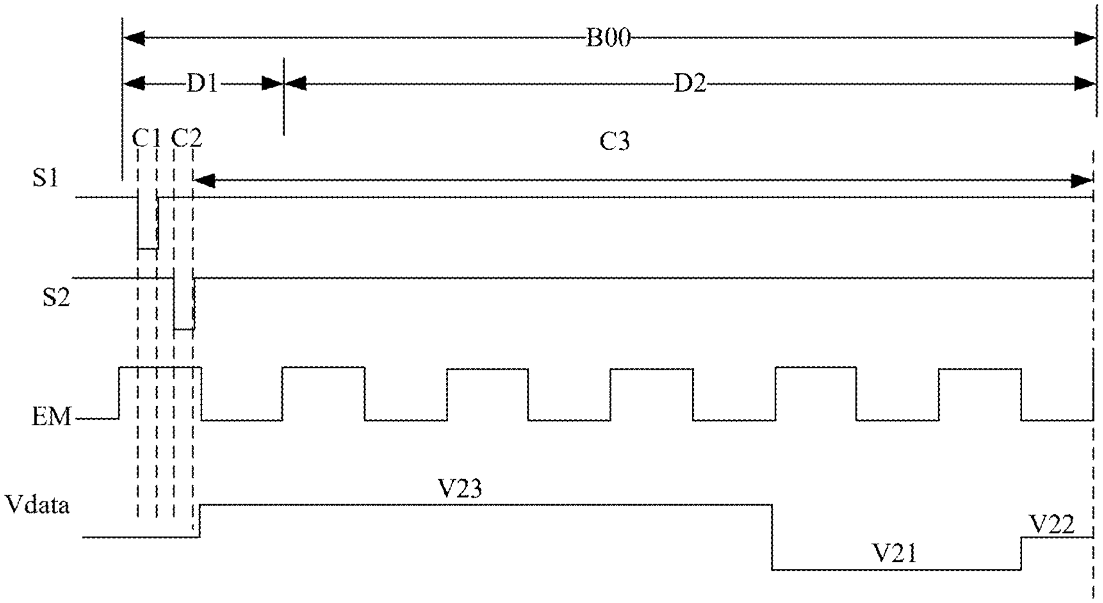
FIG. 15 illustrates another duty cycle timing diagram of a pixel circuit consistent with various embodiments of the present disclosure.

FIG. 15 illustrates another duty cycle timing diagram of a pixel circuit consistent with various embodiments of the present disclosure. In some optional embodiments, referring to FIG. 8 and FIG. 15, the working cycle B00 of an H-th row of pixel circuits 10 includes a data writing stage D1 and a light-emitting maintaining stage D2. The data writing stage D1 includes the first pulse group, and the light-emitting maintenance stage D2 includes the second pulse group to the K-th pulse group. When a pulse signal is a (K−1)-th pulse, the second level of the data signal is V21, when the pulse signal is the K-th pulse, the second level of the data signal is V22, and V21<V22. It should be noted that the H-th row of pixel circuits can be a middle row or a last row of pixel circuits, both of which are applicable herein.

In FIG. 15, the light-emitting maintenance stage D2 includes, as an example, pulse groups from a second to a sixth. The light-emitting control signal EM includes a plurality of invalid pulses and a plurality of valid pulses arranged alternately. In the light-emitting maintenance stage D2, when the pulse signal is a fourth pulse, the second level of the data signal is V21, and when the pulse signal is the sixth pulse, the second level of the data signal is V22, V21<V22. Due to the presence of leakage current, the brightness of the light-emitting element 20 corresponding to the second through the sixth valid pulses shows a decreasing trend. At the fifth valid pulse, the data signal drops to a low level, that is, V21<V22, which can couple with the first node N1, pull down the voltage of the first node N1, increase the gate-source voltage Vgs of the driving transistor T3, and increase the opening degree of the driving transistor T3. As a current input to a voltage end of the first power supply increases, the brightness of the light-emitting element 20 also increases, that is, the brightness of the light-emitting element 20 corresponding to the fifth valid pulse is increased. Additionally, the brightness corresponding to former pulses in a frame is reduced, and the brightness corresponding to next few pulses in a frame is increased, thereby easing a decreasing trend of a frame, making differences in brightness corresponding to a plurality of pulses in a frame smaller, and improving the display effect.

In some optional embodiments, referring to FIG. 15, when the pulse signal is the second to K−2 pulses, the second level of the data signal is V23, V22<V23.

In FIG. 15, as an example, the light-emitting maintenance stage D2 includes the second to the sixth pulse groups. The light-emitting control signal EM includes a plurality of invalid pulses and a plurality of valid pulses arranged alternately. In the light-emitting maintenance stage D2, at the second pulse, the data signal increases to a high level, V23>V22, and V23>V1. The data signal couples with the first node N1, pull up the voltage of the first node N1. As the driving transistor T3 is a P-type transistor, the gate-source voltage Vgs of the driving transistor T3 decreases, and the opening degree of the driving transistor T3 decreases. A current input to the voltage end of the first power supply decreases and the brightness of the light-emitting element 20 also decreases, so that the brightness of the light-emitting element 20 corresponding to a second valid pulse is close to the brightness of the light-emitting element 20 corresponding to a third valid pulse. In essence, the flicking brightness of the light-emitting element 20 is kept consistently similar and is not easily recognized by human eyes.

In some optional embodiments, referring to FIGS. 4-15, the pixel circuit 10 further includes a third transistor T4 connected in series between the first node N1 and the first reset signal line. In response to the second scanning signal S1, the third transistor T4 is turned on and transmits a signal from the first reset signal line to the gate of the driving transistor T3. The first scanning signal S2 includes a valid signal and an invalid signal, and the second scanning signal S1 includes a valid signal and an invalid signal. The cut-off time of the valid signal of the second scanning signal S1 occurs before the start time of the valid signal of the first scanning signal S2. It can be understood that the third transistor T4 functions to reset the gate voltage of the driving transistor. Therefore, the first node N1 is reset before proceeding with the data writing.

Specifically, a light-emitting cycle of the pixel circuit 10 begins with the reset stage C1. The valid signal of the second scanning signal S1 controls the third transistor T4 to be turned on, and the reset signal is written into the first node N1 to initialize the gate of the driving transistor T3. The valid signal of the second scanning signal S1 controls the fifth transistor T6 to be turned on. The reset signal is written into the anode of the light-emitting element 20 to reset the anode of the light-emitting element 20.

In one light-emitting cycle of the pixel circuit 10, the reset stage C1 is followed by the data signal writing stage C2. In the data signal writing stage C2, the second scanning signal S1 transmitted to the gate of the third transistor T4 is an invalid signal, and the third transistor T4 is turned off. In the reset stage C1, when the reset signal is written to the first node N1, the driving transistor T3 is turned on, the valid signal from the first scanning signal S2 is transmitted to the gate of the first transistor T1, and the first transistor T1 is turned on. The first level V1 of the data signal is written into the first node N1, a valid signal from the first scanning signal S2 is transmitted to the gate of the fourth transistor T5, and the fourth transistor T5 is turned on, so the data signal is written to the first node N1 through the first transistor T1, the driving transistor T3, and the fourth transistor T5. The voltage of the second node N2 is equal to a voltage of the data signal, that is, $V_{N2}=V_{data}$. The voltages of the first node N1 and the third node N3 are equal to the difference between the voltage of the data signal and the threshold voltage of the driving transistor T3, that is, $V_{N1}=V_{N3}=V_{data}-|Vth|$.

The cut-off time of the valid signal of the second scanning signal S1 occurs before the start time of the valid signal of the first scanning signal S2. Therefore, the first node N1 is reset first to prevent the residual charge on the gate of the driving transistor T3 from displaying a previous frame from affecting a current frame.

In some optional embodiments, referring to FIGS. 8-12, the pixel circuit 10 further includes a fourth transistor T5 connected in series between the first node N1 and the drain of the driving transistor T3. The fourth transistor T5 is turned on in response to the first scanning signal S2 and transmits a signal from the drain of the driving transistor T3 to the gate of the driving transistor T3.

Specifically, in the data signal writing stage C2, the gate of the fourth transistor T5 receives the first scanning signal S2 and is turned on when the first scanning signal S2 is a valid signal. A signal from the drain of the driving transistor T3 is transmitted to the gate of the driving transistor T3 through the fourth transistor T5. In the data signal writing stage C2, the second scanning signal S1 transmitted to the gate of the third transistor T4 is an invalid signal, and the third transistor T4 is turned off. In the reset stage C1, when the reset signal is written to the first node N1, the driving transistor T3 is turned on, the valid signal from the first scanning signal S2 is transmitted to the gate of the first transistor T1, and the first transistor T1 is turned on. The first level V1 of the data signal is written into the first node N1, a valid signal from the first scanning signal S2 is transmitted to the gate of the fourth transistor T5, and the fourth transistor T5 is turned on, so the data signal is written to the first node N1 through the first transistor T1, the driving transistor T3, and the fourth transistor T5. The voltage of the second node N2 is equal to the voltage of the data signal, that is, $V_{N2}$=Vdata. The voltages of the first node N1 and the third node N3 are equal to the difference between the voltage of the data signal and the threshold voltage of the driving transistor T3, that is, $V_{N1}=V_{N3}=V_{data}-|V_{th}|$.

In some optional embodiments, referring to FIGS. 8-12, the pixel circuit 10 further includes a fifth transistor T6 connected in series between the anode of the light-emitting element 20 and a second reset signal line. The fifth transistor T6 is turned on in response to the second scanning signal S1, and transmits the signal transmitted by the second reset signal line to the anode of the light-emitting element 20.

The fifth transistor T6 is connected in series between the second reset signal line and the anode of the light-emitting element 20 to reset the anode of the light-emitting element 20. The second reset signal line and the first reset signal line may be a same signal line, thereby reducing wiring in the display panel 100. The second reset signal line and the first reset signal line can also be arranged separately, allowing for an input of different reset voltages.

The fifth transistor T6 is turned on in response to a valid signal of the second scanning signal S1, and a reset signal VREF2 from the second reset signal line is transmitted to the anode of the light-emitting element 20 to reset the anode of the light-emitting element 20, thereby preventing any residual charge of the anode of the light-emitting element 20 from affecting a current frame when a previous frame is displayed.

In some optional embodiments, referring to FIG. 6, driving frequencies of the display panel 100 includes a first driving frequency less than or equal to 60 Hz.

It can be understood that the first driving frequency is a low frequency. At low frequency, the leakage current becomes more serious due to a presence of the front and rear corridor period K02, resulting in a greater brightness difference and more serious flicker in the front and rear corridor period K02. Specifically, the display panel 100 supports both high-frequency and low-frequency display modes, and frequency adjustment for a same display device is typically achieved by using the "Long V" method. "Long V" means that the refresh time of each display frame remains same at 60 Hz and 120 Hz. However, when the display panel operates at a refresh frequency of 60 Hz, each display frame includes a blank frame, and an actual display effect is equivalent to 60 Hz. In one embodiment, the first driving frequency is less than or equal to 60 Hz. Leakage current occurs in the front and rear corridor period K02, leading to flickering in different frames. In the present disclosure, a coupling effect occurs between the data line 6 and the first node N1 in the front and rear corridor period K02. The second level V2 of the data signal may affect the voltage of the first node N1, leading to a decrease in the gate-source voltage Vgs of the driving transistor T3. The opening degree of the driving transistor T3 is reduced, and the generated driving current is reduced, thereby reducing the brightness of the light-emitting element 20, superimposing the leakage effect, interfering with an influence of the leakage effect on flicker and improving the flicker problem.

In some optional embodiments, referring to FIG. 5, the display panel also includes a second capacitor 8. The first node N1 includes a first part 81, and the data line 6 includes a second part 82. A gap exists between an orthographic projection of the first part 81 on the base substrate 01 and an orthographic projection of the second part 82 on the base substrate 01. The first part 81 is multiplexed as a first plate of the second capacitor 8, and the second part 82 is multiplexed as a second plate of the second capacitor 8.

Specifically, the second capacitor 8 is a parasitic capacitance, and a gap exists between the orthographic projection of the first part 81 on the base substrate 01 and the orthographic projection of the second part 82 on the base substrate 01. The first part 81 of the first node N1 overlaps the second part 82 of the data line 6 in the first direction X, so that the first part 81 and the second part 82 generate parasitic capacitance. The first part 81 is multiplexed as the first plate of the second capacitor 8, and the second part 82 is multiplexed as the second plate of the second capacitor 8. When the data line 6 transmits a data signal, a voltage of the data line 6 changes, and a voltage of the second part 82 also changes. When a voltage of the second plate of the second capacitor 8 changes, a voltage of the first plate of the second capacitor 8 also changes accordingly, so that the voltage of the first node N1 changes. In the present disclosure, the first part 81 is multiplexed as the first plate of the second capacitor 8, and the second part 82 is multiplexed as the second plate of the second capacitor 8. In the front and rear corridor period K02, the second level V2 transmitted by the data line 6 is transmitted to the second part 82, which changes the voltage of the first node N1 according to a principle of capacitive coupling, so that the gate-source voltage Vgs of the driving transistor T3 decrease and the turn-on amplitude of the driving transistor T3 decreases, thereby reducing the brightness of the light-emitting element 20, superimposing the leakage effect, interfering with an influence of the leakage effect on flicker and improving the flicker problem.

Figure 16:
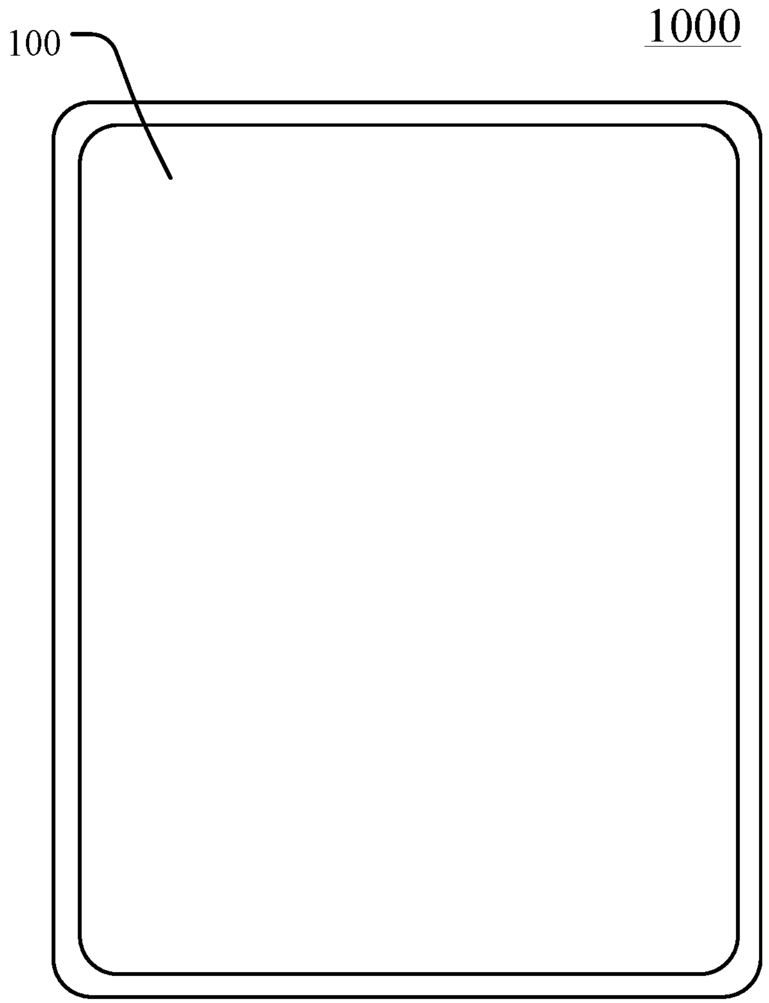
FIG. 16 illustrates a planar view of a display device consistent with various embodiments of the present disclosure.

FIG. 16 illustrates a planar view of a display device consistent with various embodiments of the present disclosure. In some optional embodiments, referring to FIG. 16, the display device 1000 includes the display panel 100 provided in the above embodiments. The embodiment in FIG. 16 only uses a mobile phone as an example to illustrate the display device 1000. It can be understood that the display device 1000 provided by the embodiment may be a mobile phone, a tablet, a computer, a TV, a vehicle display device and other display device 1000 with display and touch functions, which is not specially limited herein. The display device 1000 provided by the embodiment has beneficial effects of the display panel 100 provided by any one of the above embodiments. For details, reference may be made to the specific descriptions of the display panel 100 in the above embodiments, which are not repeated herein.

As disclosed, the display panel and the display device provided by the present disclosure at least realize the following beneficial effects.

In the display panel of the present disclosure, a pixel circuit includes: a driving transistor, a gate of the driving transistor being electrically connected to a first node and providing a driving current for a light-emitting element; a first transistor, connected in series between the driving transistor and the data line, transmitting a data signal to the driving transistor in response to a first scanning signal; a second transistor, electrically connected between the driving transistor and the light-emitting element, and transmitting a driving current to the light-emitting element in response to a light-emitting control signal; a first capacitor, a first plate of the first capacitor being electrically connected to the first node, a second plate of the first capacitor being electrically connected to the first power supply voltage line; and the first node, on a side of the second plate of the first capacitor away from a base substrate. A driving cycle of the display panel includes the display area scanning period and the front and rear gallery areas. A plurality of pixel circuits is arranged in M rows and N columns, N≥2 and M≥2. The data line transmits a data signal. In a display area scanning period, at least one data signal includes a first level V1. In a front and rear corridor period, the data signal includes a second level V2, and V1 V2. In the front and rear corridor period, a coupling effect occurs between the data line and the first node. The second level V2 of the data signal may affect a voltage of the first node, so that the gate-source voltage Vgs of the driving transistor decreases. An opening degree of the driving transistor is reduced, and a generated driving current is reduced, thereby reducing the brightness of the light-emitting element, superimposing the leakage effect, interfering with an influence of the leakage effect on flicker and improving the flicker problem.

Although specific embodiments of the present disclosure have been described in detail by way of examples, a person skilled in the art should understand that the above embodiments are for illustration only, rather than limiting the scope of the present disclosure. A person skilled in the art can make modifications without departing from the scope and spirit of the present disclosure. The scope of the present disclosure is defined by the appended claims.

What is claimed is:

1. A display panel, comprising:

a base substrate;

a plurality of pixel circuits, on a side of the base substrate; and light-emitting elements electrically connected to the plurality of pixel circuits, wherein a pixel circuit of the plurality of pixel circuits includes:

a driving transistor, a gate of the driving transistor being electrically connected to a first node and providing a driving current for a light-emitting element of the light-emitting elements, a first transistor, electrically connected in series between the driving transistor and a data line, and transmitting a data signal to the driving transistor in response to a first scanning signal, a second transistor, electrically connected between the driving transistor and the light-emitting element of the light-emitting elements, and transmitting the driving current to the light-emitting element of the light-emitting elements in response to a light-emitting control signal, a first capacitor, a first plate of the first capacitor being electrically connected to the first node, and a second plate of the first capacitor being electrically connected to a voltage line of a first power supply, and the first node, coupled to a side of the second plate of the first capacitor through the first plate of the first capacitor, wherein:

the plurality of pixel circuits are arranged in M rows and N columns, N≥2, and M≥2, the data line transmits the data signal in a display area scanning period, and the data signal in the display area scanning period includes a first level V1, the data line transmits the data signal in a front and rear corridor period, and the data signal in the front and rear corridor period includes a second level V2, $$V1 \neq V2,$$

a total duration of the display area scanning period is t1, a total duration of the front and rear corridor period is t2, and t1<t2, and $$t1/(t1+t2) \leq 1/4, \text{ and}$$

wherein:

the M rows are arranged along a first direction;

the first scanning signal includes a valid signal and an invalid signal, and the first transistor is turned on when the first scanning signal is a valid signal;

the display panel includes a first driving cycle and a second driving cycle adjacent to the first driving cycle;

a starting time of the display area scanning period coincides with an initiation of a valid signal from the first scanning signal corresponding to a first row of pixel circuits in the first driving cycle, while a cut-off time of the display area scanning period aligns with a termination of a valid signal from the first scanning signal corresponding to a M-th row in the first driving cycle; and a starting time of the front and rear corridor period aligns with a termination of a valid signal from the first scanning signal corresponding to the M-th row in the first driving cycle, and a cut-off time of the front and rear corridor period coincides with an initiation of a valid signal of the first scanning signal corresponding to the first row of pixel circuits in the second driving cycle.

2. The display panel according to claim 1, wherein t1:t2=1/3, 1/4, or 1/5.

3. The display panel according to claim 1, further comprising M light-emitting control signal lines, wherein:

a light-emitting control signal line of the M light-emitting control signal lines is electrically connected to a gate of the second transistor to transmit the light-emitting control signal, and M is a positive integer greater than 2;

the light-emitting control signal includes K valid pulses and K invalid pulses arranged alternately, and K is a positive integer greater than or equal to 2; and a working cycle of the M-th row includes a data writing stage and a light-emitting maintenance stage, the data writing stage includes a first pulse group, and the light-emitting maintenance stage includes a second to a K-th pulse group.

4. The display panel according to claim 3, wherein K=4, 5 or 6.

5. The display panel according to claim 3, wherein the data signal remains at the second level V2 in the front and rear corridor period.

6. The display panel according to claim 5, wherein:

the driving transistor is a P-type transistor, and the first level V1 of the data signal is less than the second level V2 of the data signal; or the driving transistor is an N-type transistor, and the first level V1 of the data signal is greater than the second level V2 of the data signal.

7. The display panel according to claim 3, wherein:

the M rows comprise a H-th row, and a working cycle of the H-th row includes the data writing stage and the light-emitting maintenance stage, the data writing stage includes the first pulse group, the light-emitting maintenance stage includes the second to a K-th pulse group, when a pulse signal is a (K−1)-th pulse, the second level of the data signal is V21, when the pulse signal is the K-th pulse, the second level of the data signal is V22, V21<V22, and 1<H<M.

8. The display panel according to claim 7, wherein when the pulse signal is the second to a (K−2)-th pulse, the second level of the data signal is V23, and V22<V23.

9. The display panel according to claim 1, further comprising M light-emitting control signal lines, wherein:

a light-emitting control signal line of the M light-emitting control signal lines is electrically connected to a gate of the second transistor to transmit a light-emitting control signal, and M is a positive integer greater than 2;

the light-emitting control signal includes a plurality of invalid pulses and a plurality of valid pulses arranged alternately; and in a working cycle of the M-th row, a total duration of the valid pulses is T1, a total duration of the invalid pulses is T2, and 10%≤T1/(T1+T2)≤50%.

10. The display panel according to claim 1, wherein:

the pixel circuit also includes a third transistor electrically connected in series between the first node and a first reset signal line, is turned on in response to a second scanning signal, and switches a signal from the first reset signal line to the gate of the driving transistor; and the first scanning signal includes a valid signal and an invalid signal, the second scanning signal includes a valid signal and an invalid signal, a cut-off time of a valid signal of the second scanning signal occurs before a starting time of a valid signal of the first scanning signal.

11. The display panel according to claim 1, wherein the pixel circuit further includes a fourth transistor connected in series between the first node and a drain of the driving transistor, the fourth transistor is turned on in response to the first scanning signal and transmits a signal from the drain of the driving transistor to the gate of the driving transistor.

12. The display panel according to claim 1, wherein the pixel circuit further includes a fifth transistor connected in series between an anode of the light-emitting element and a second reset signal line, the fifth transistor is turned on in response to a second scanning signal, and transmits a signal transmitted by the second reset signal line to the anode of the light-emitting element.

13. The display panel according to claim 1, wherein driving frequencies of the display panel include a first driving frequency less than or equal to 60 Hz.

14. The display panel according to claim 1, further comprising a second capacitor, wherein:

the first node includes a first part, and the data line includes a second part, and a gap exists between an orthographic projection of the first part on the base substrate and an orthographic projection of the second part on the base substrate; and the first part is multiplexed as a first plate of the second capacitor, and the second part is multiplexed as a second plate of the second capacitor.

15. A display device, comprising a display panel comprising:

a base substrate;

a plurality of pixel circuits, on a side of the base substrate; and light-emitting elements electrically connected to the plurality of pixel circuits, a pixel circuit of the plurality of pixel circuits including:

a driving transistor, a gate of the driving transistor being electrically connected to a first node and providing a driving current for a light-emitting element of the light-emitting elements, a first transistor, electrically connected in series between the driving transistor and the data line, and transmitting a data signal to the driving transistor in response to a first scanning signal, a second transistor, electrically connected between the driving transistor and the light-emitting element of the light-emitting elements, and transmitting a driving current to the light-emitting element of the light-emitting elements in response to a light-emitting control signal, a first capacitor, a first plate of the first capacitor being electrically connected to the first node, and a second plate of the first capacitor being electrically connected to a voltage line of the first power supply, and the first node, coupled to a side of the second plate of the first capacitor through the first plate of the first capacitor, wherein:

the plurality of pixel circuits are arranged in M rows and N columns, N≥2, and M≥2, the data line transmits the data signal in a display area scanning period, and the data signal in the display area scanning period includes a first level V1, the data line transmits the data signal in a front and rear corridor period, and the data signal in the front and rear corridor period includes a second level V2, $V1 \neq V2,$ a total duration of the display area scanning period is t1, a total duration of the front and rear corridor period is t2, and t1<t2, and $t1/(t1+t2) \leq 1/4,$ and wherein:

the M rows are arranged along a first direction;

the first scanning signal includes a valid signal and an invalid signal, and the first transistor is turned on when the first scanning signal is a valid signal;

the display panel includes a first driving cycle and a second driving cycle adjacent to the first driving cycle;

a starting time of the display area scanning period coincides with an initiation of a valid signal from the first scanning signal corresponding to a first row of pixel circuits in the first driving cycle, while a cut-off time of the display area scanning period aligns with a termination of a valid signal from the first scanning signal corresponding to a M-th row in the first driving cycle; and a starting time of the front and rear corridor period aligns with a termination of a valid signal from the first scanning signal corresponding to the M-th row in the first driving cycle, and a cut-off time of the front and rear corridor period coincides with an initiation of a valid signal of the first scanning signal corresponding to the first row of pixel circuits in the second driving cycle.

* * * * *